United States Patent Office 3,513,758
Patented May 26, 1970

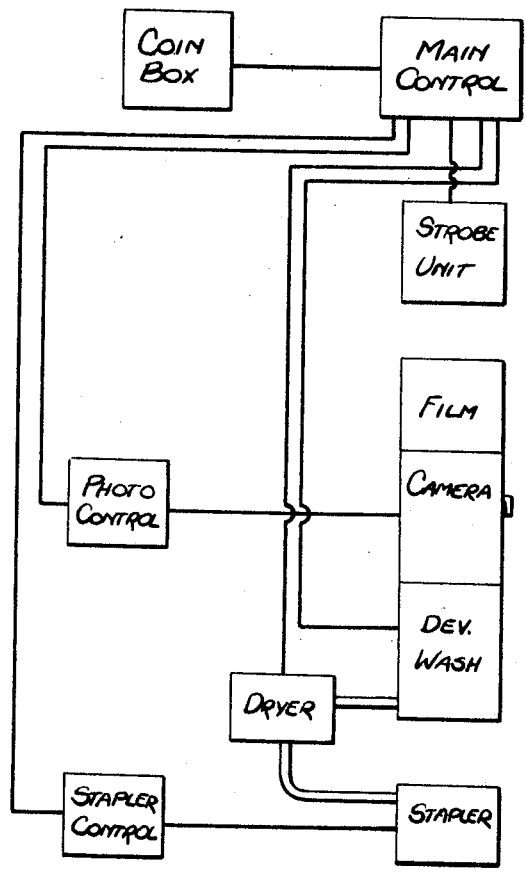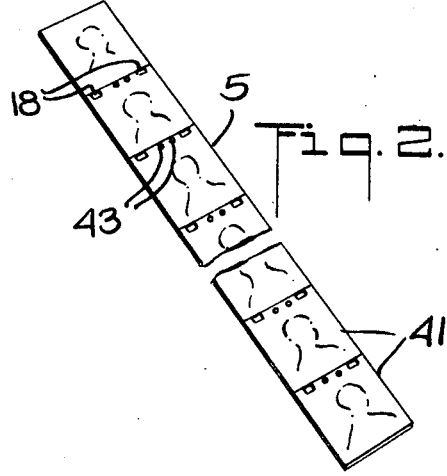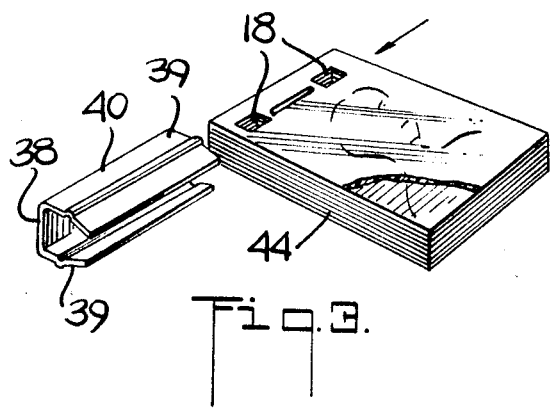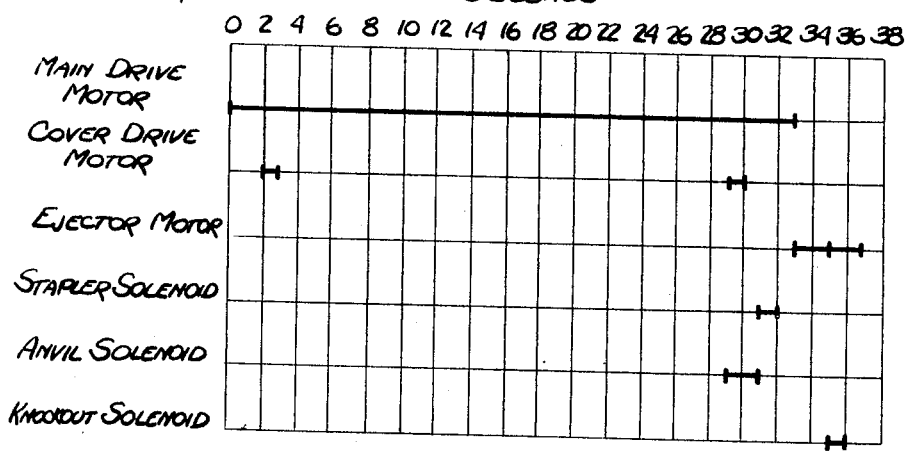

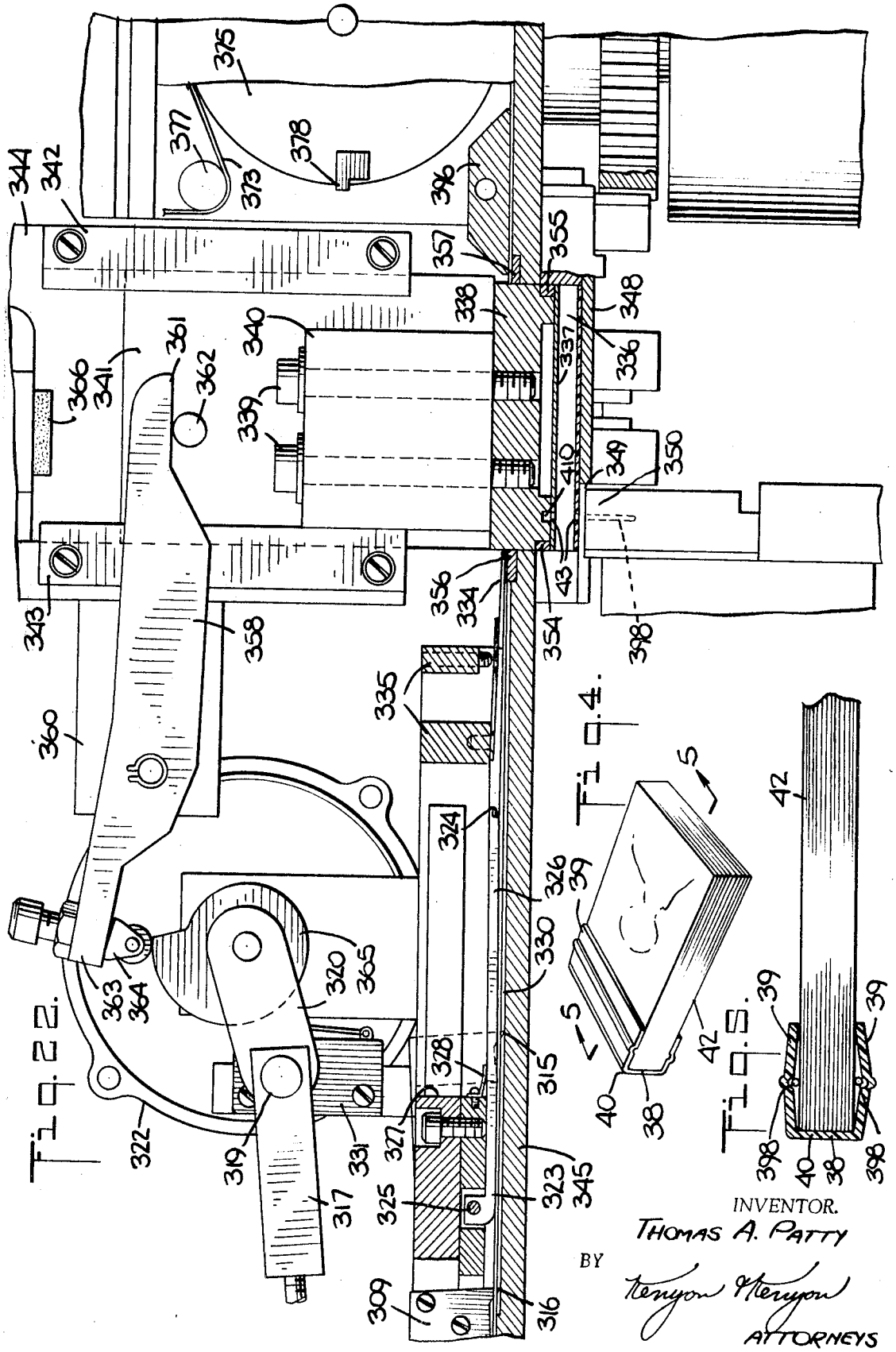

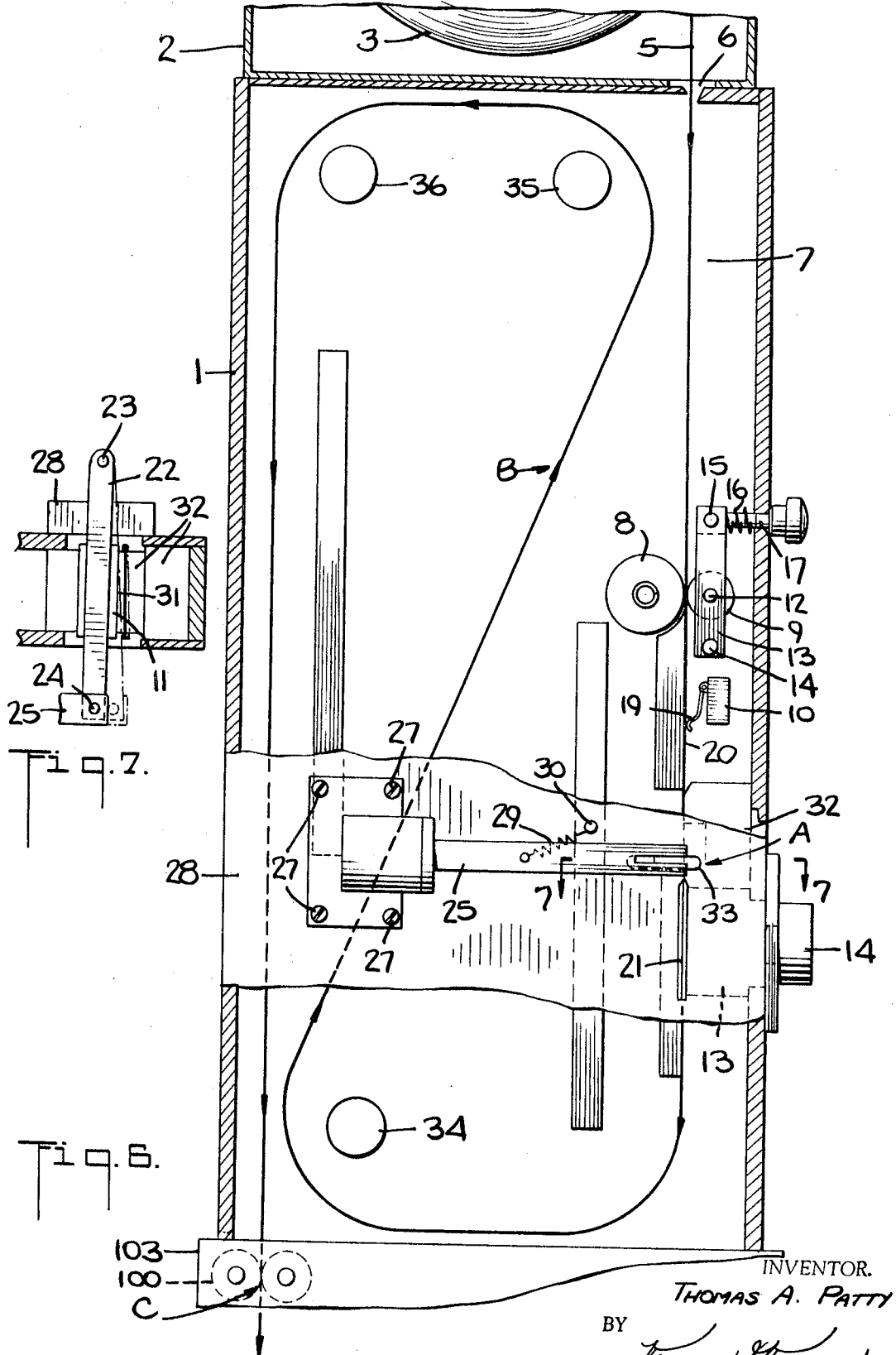

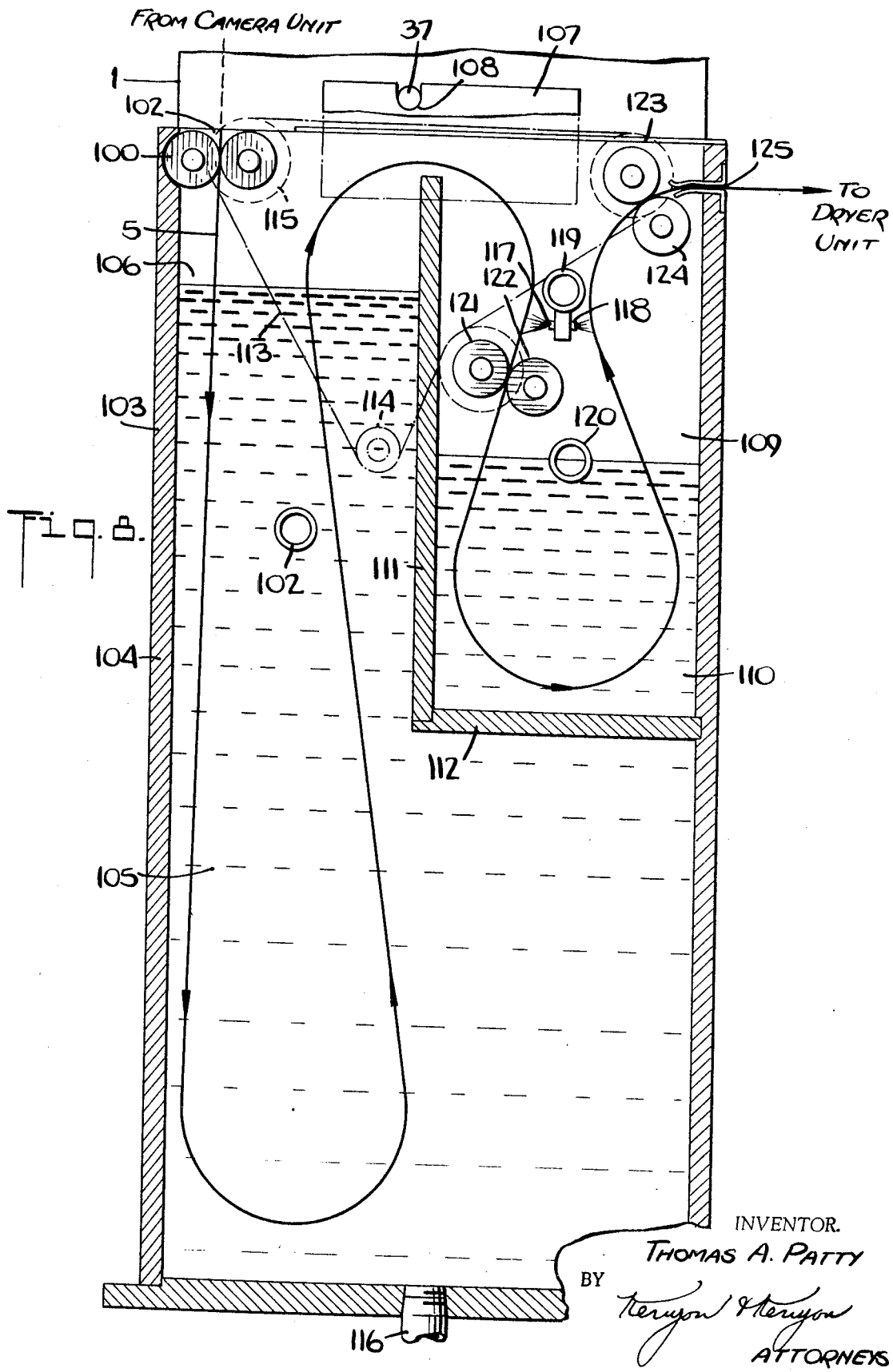

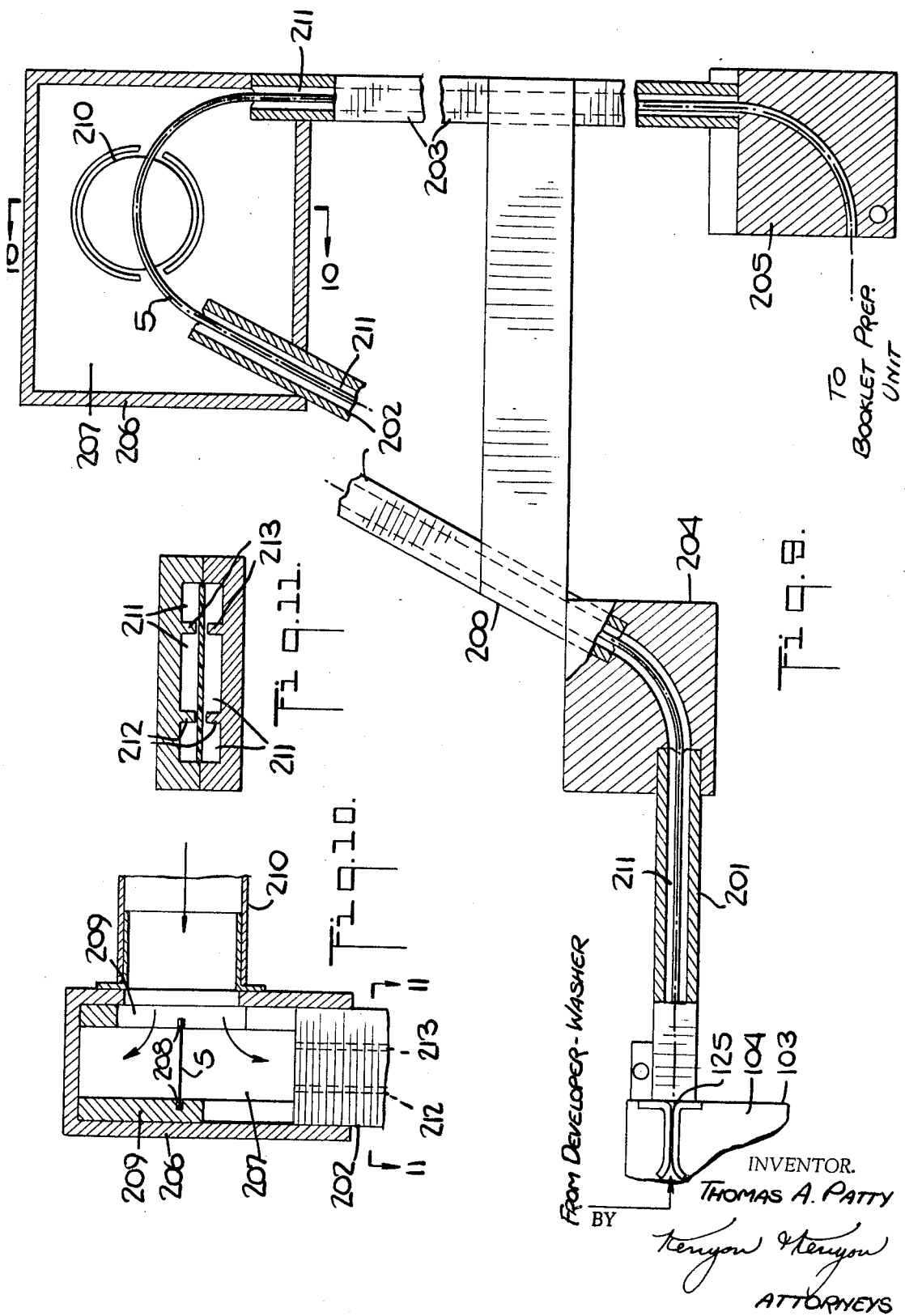

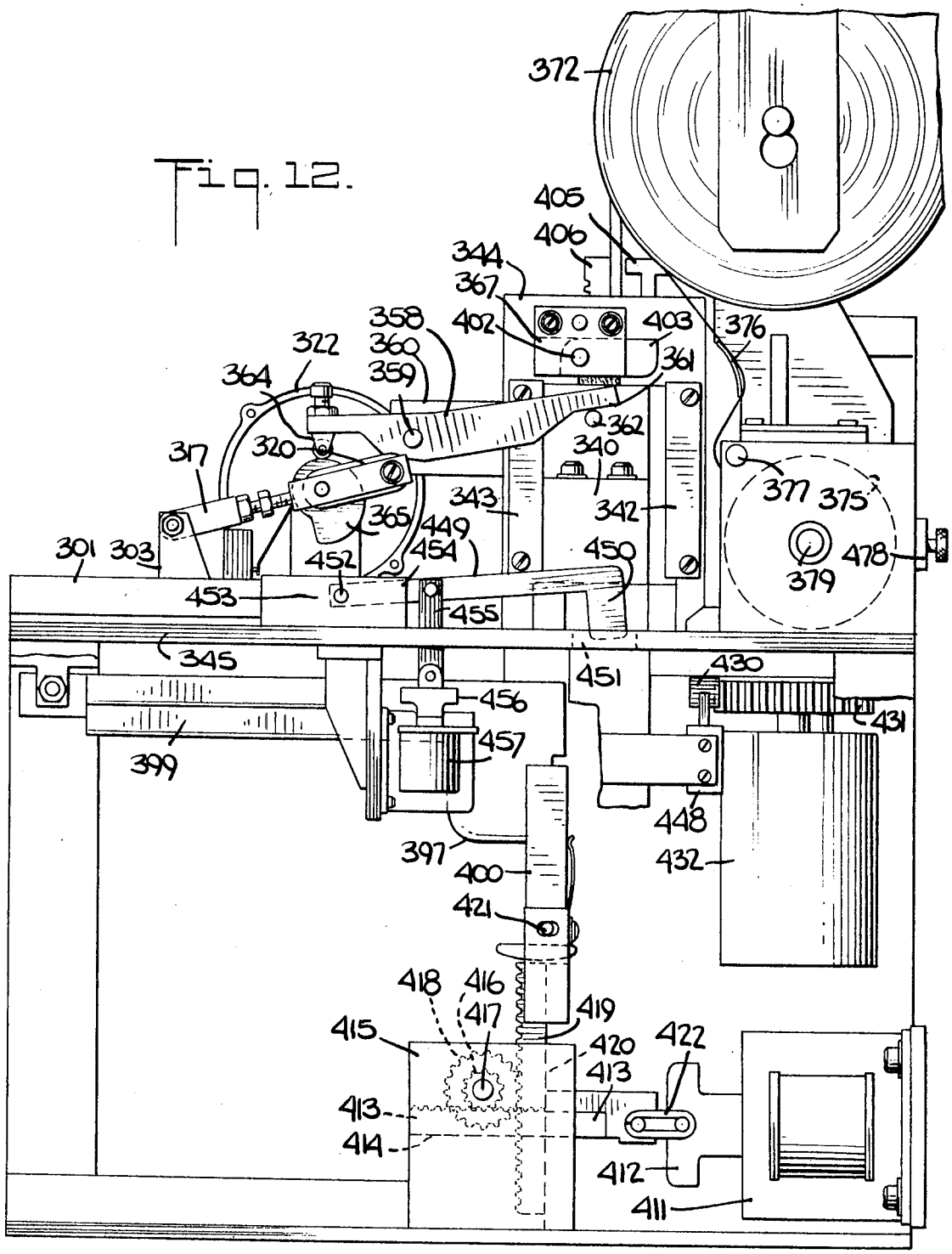

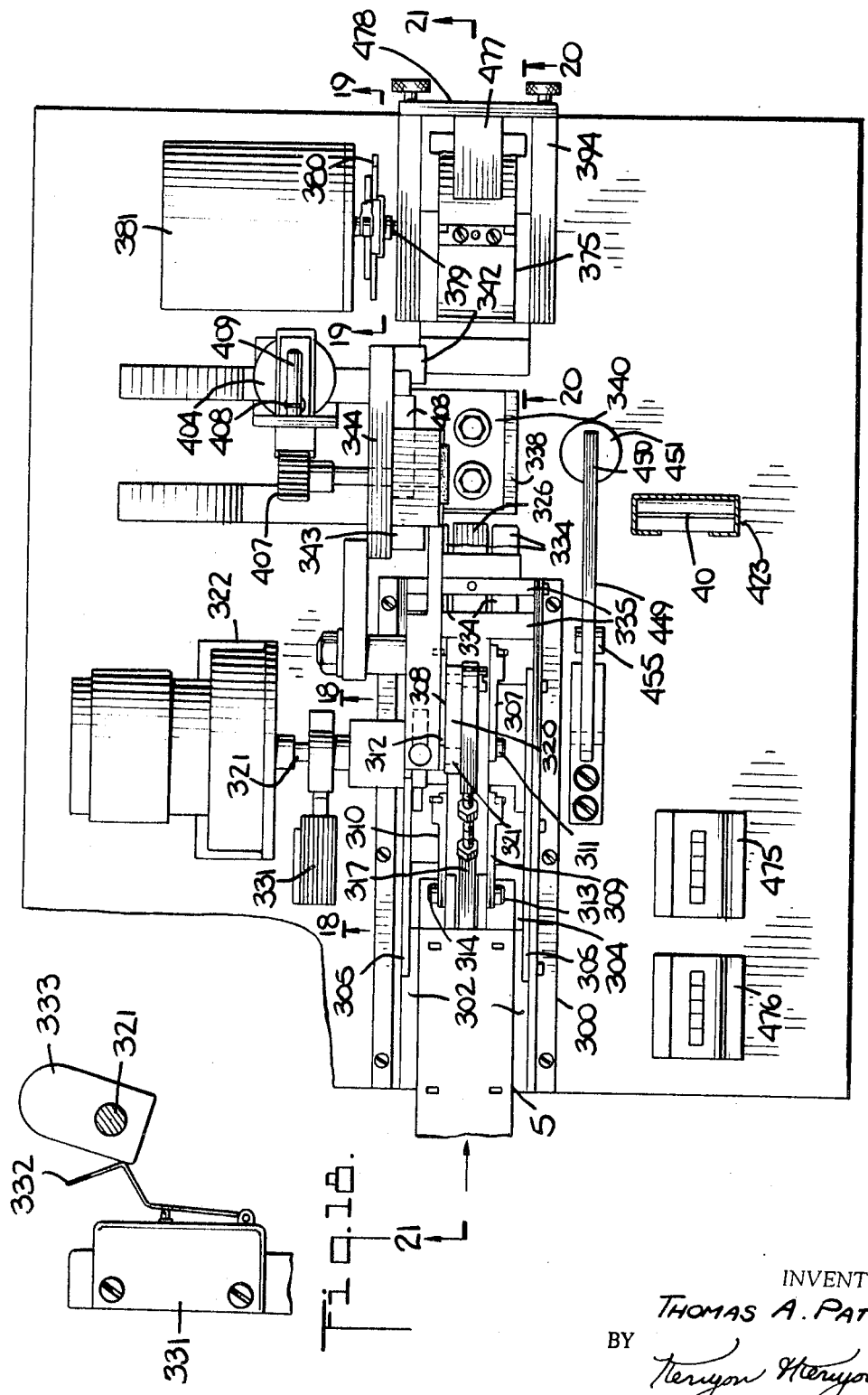

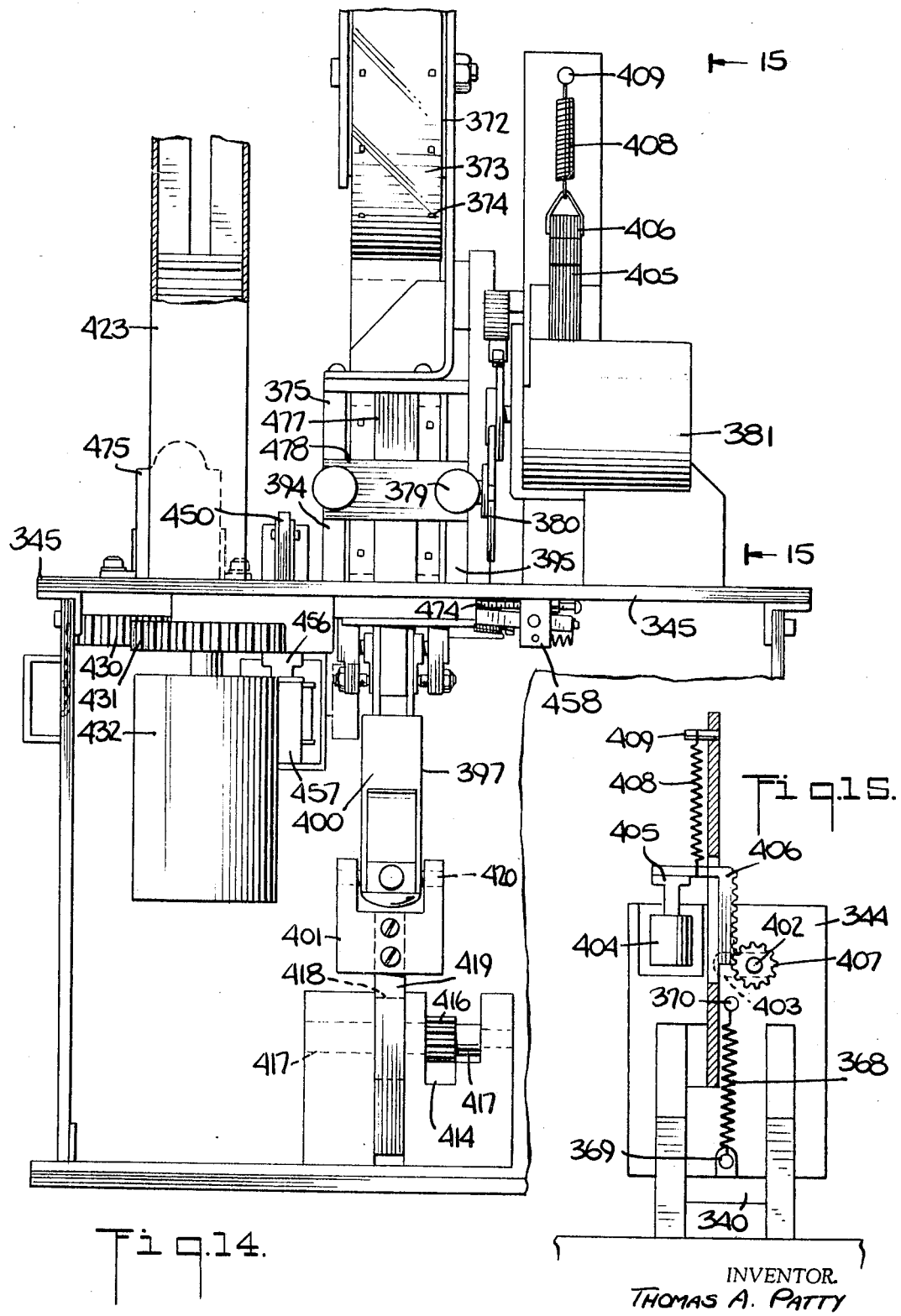

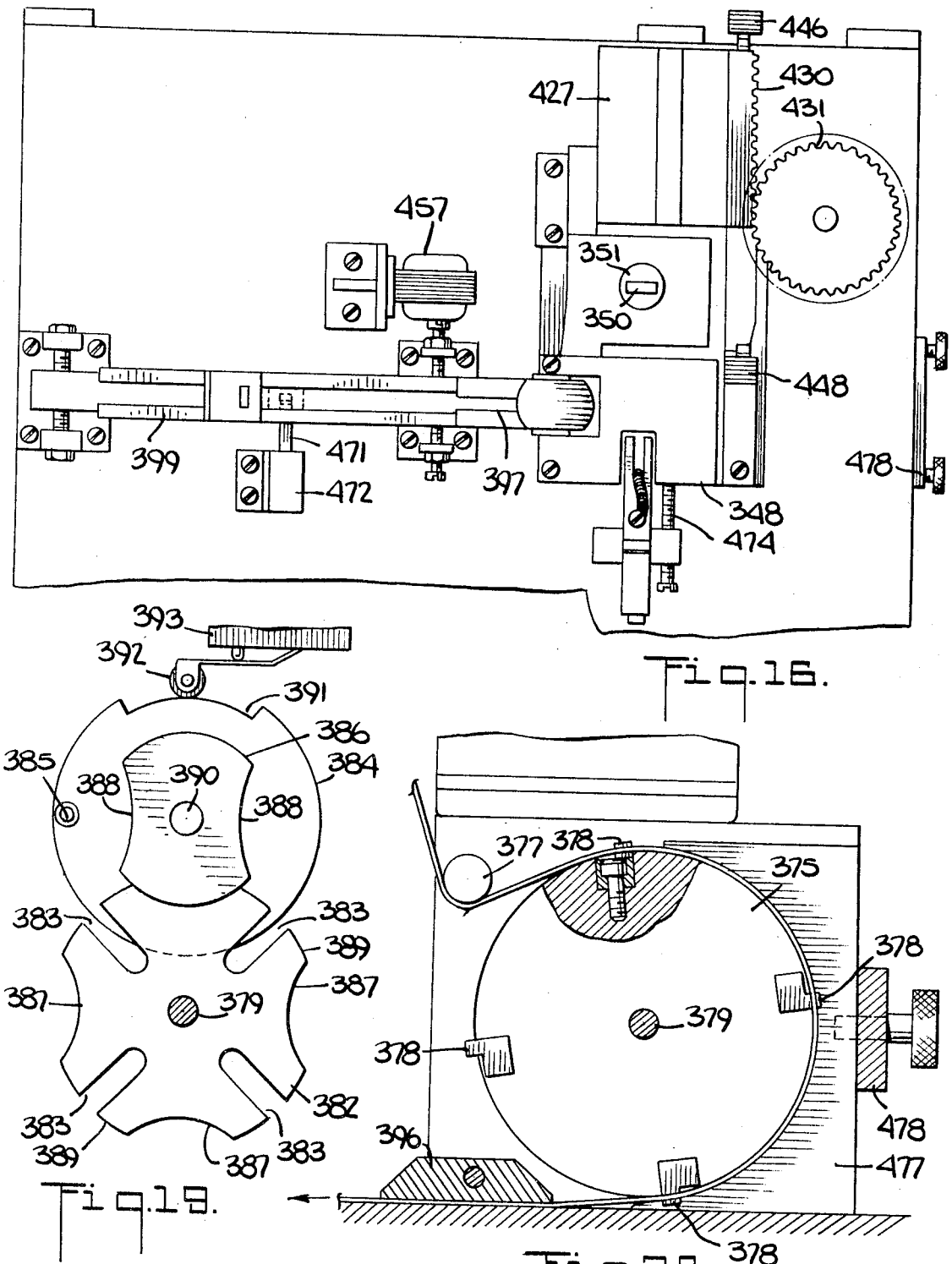

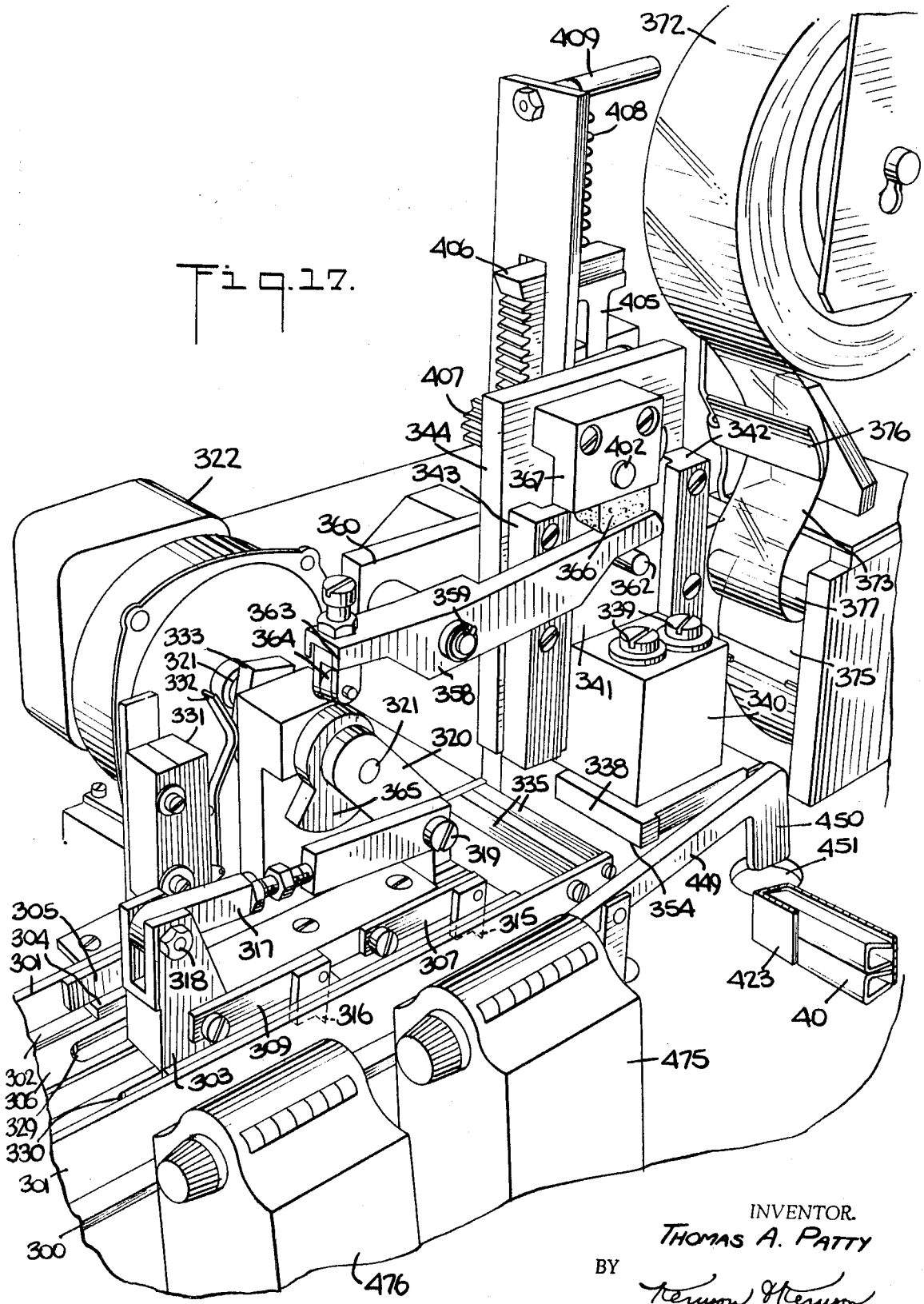

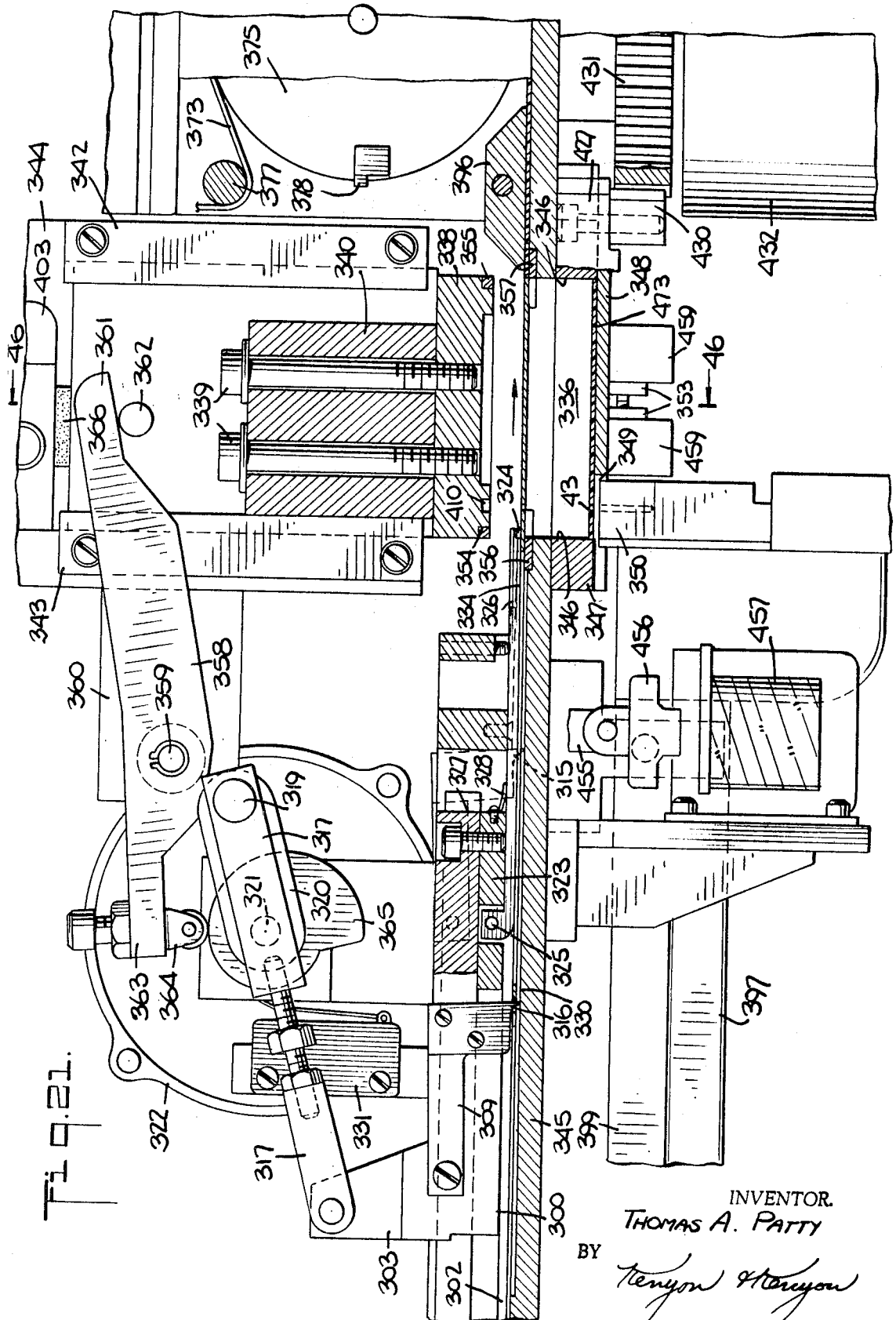

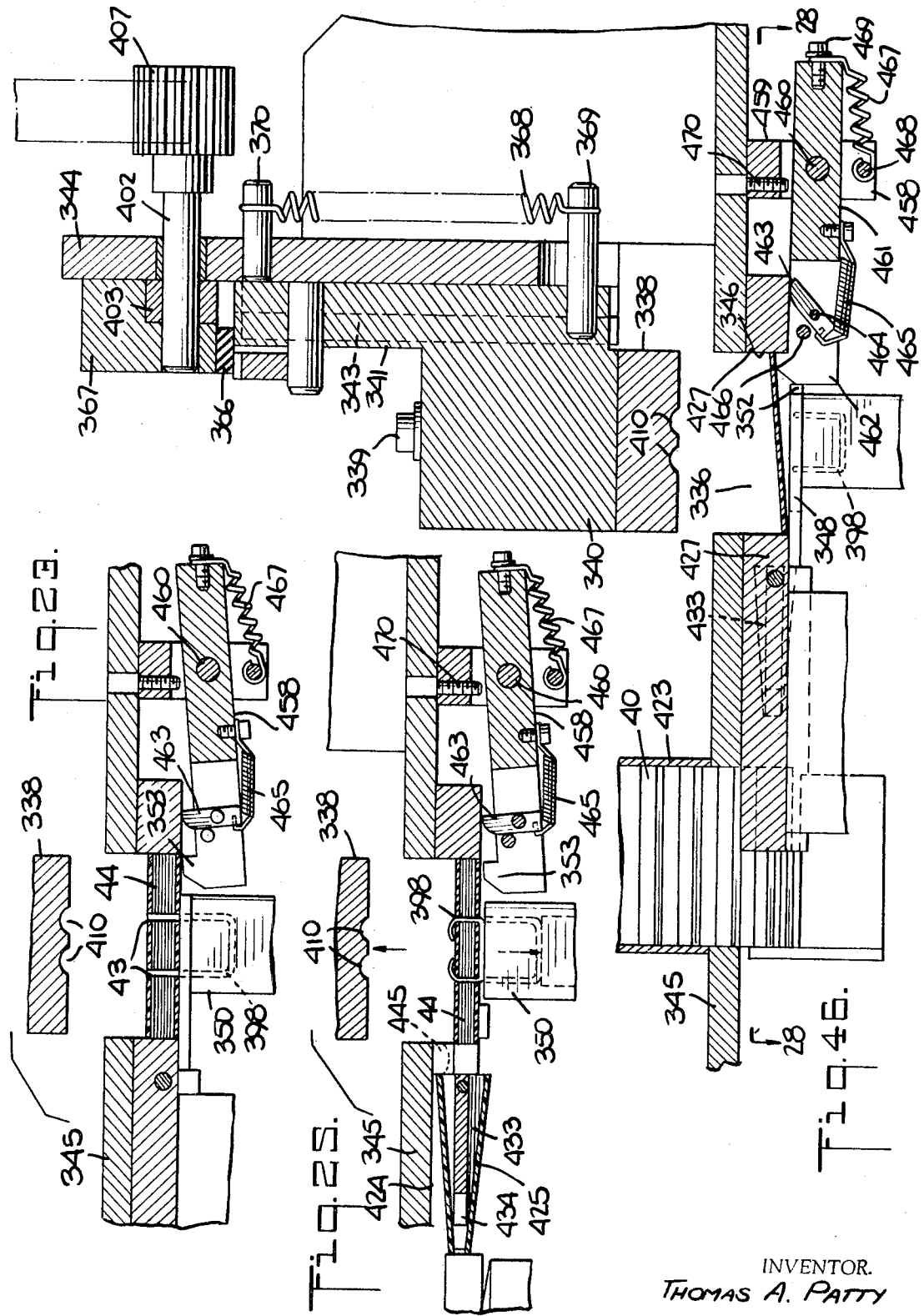

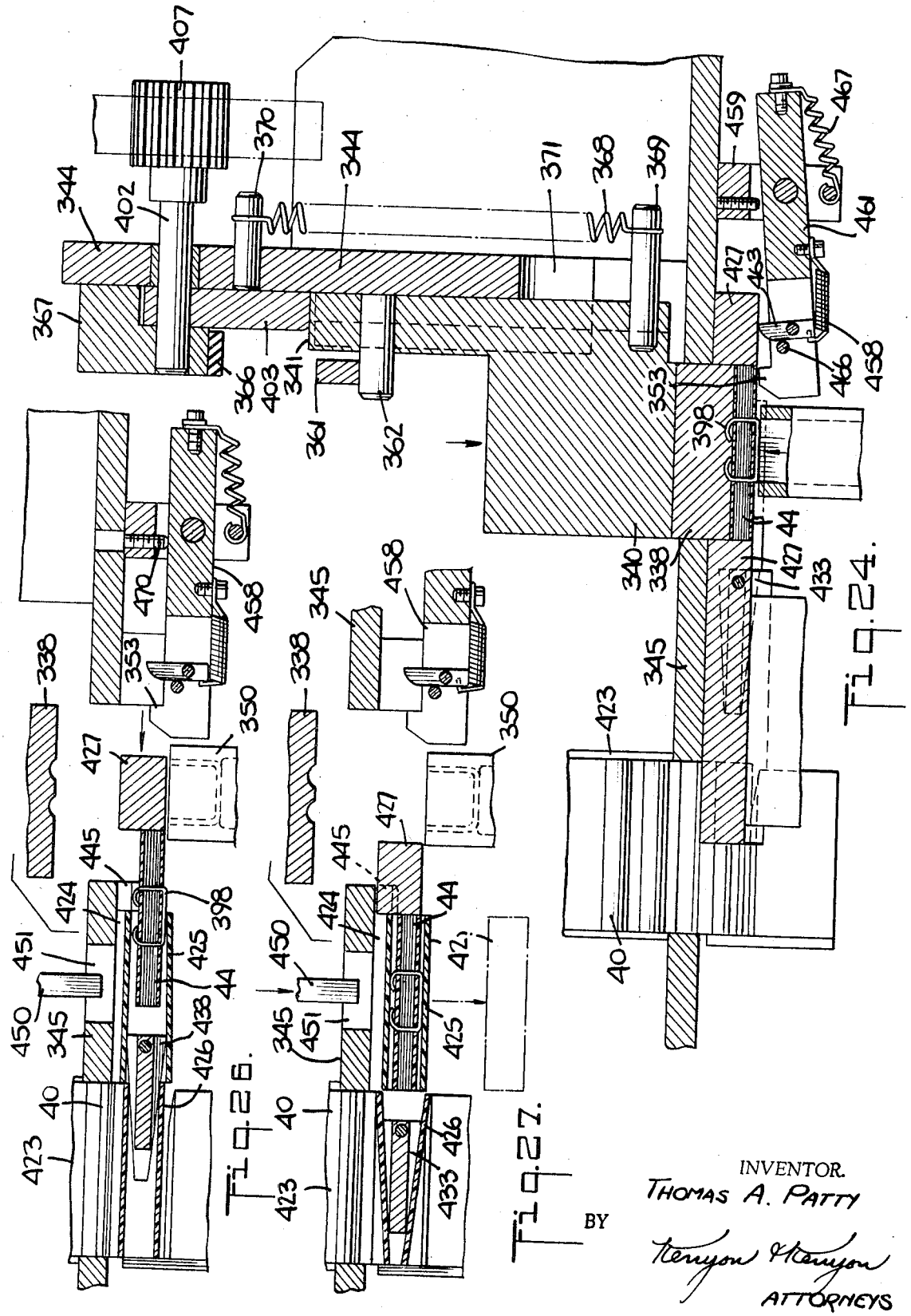

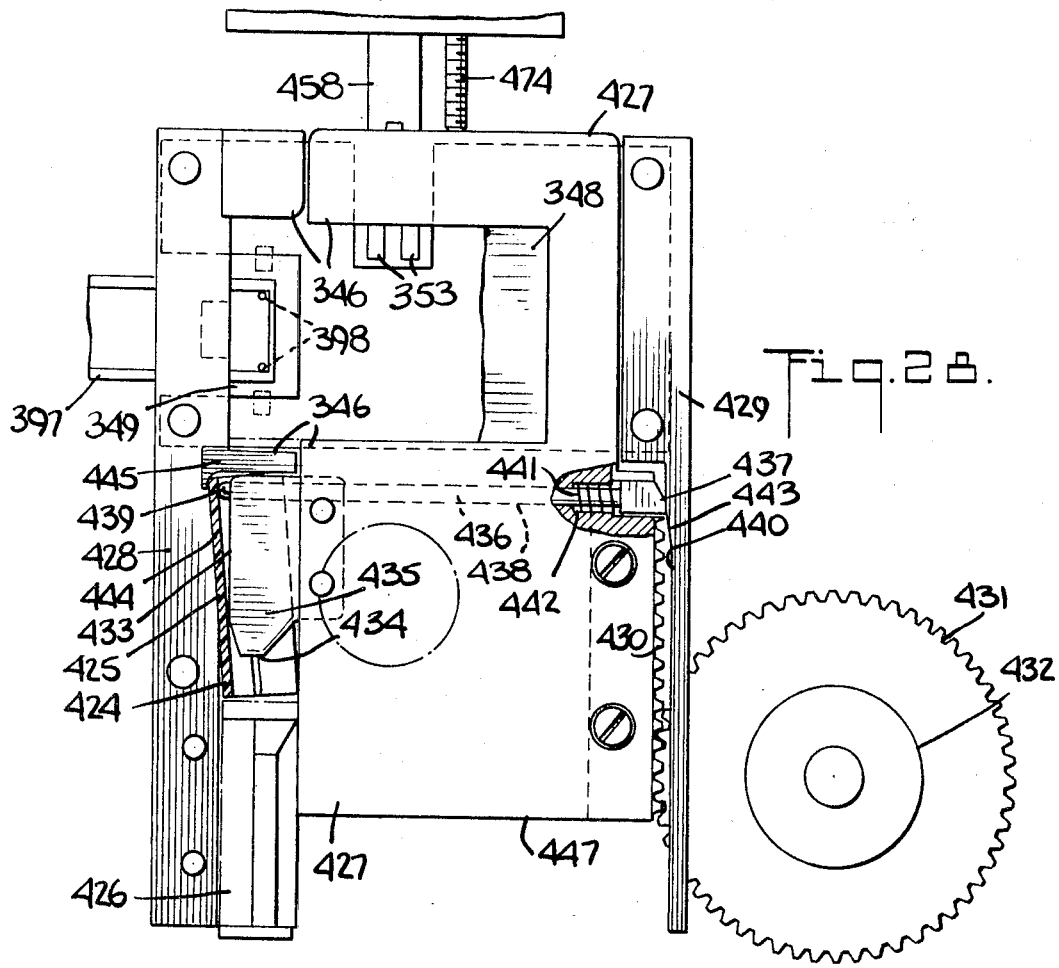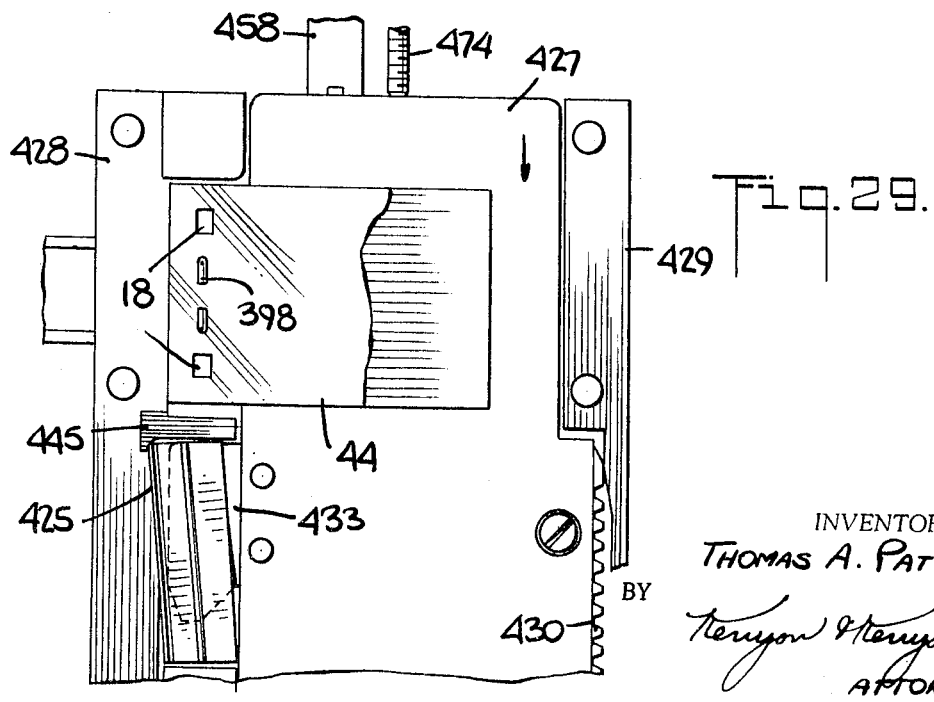

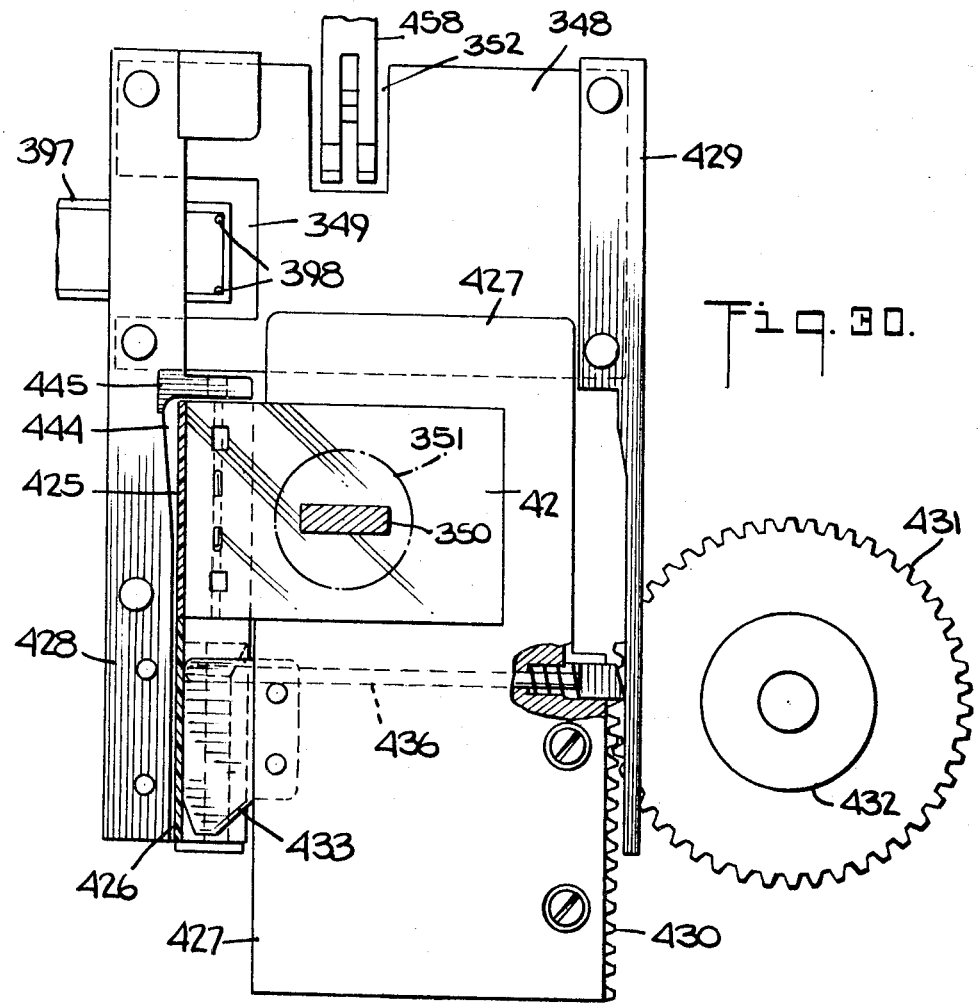
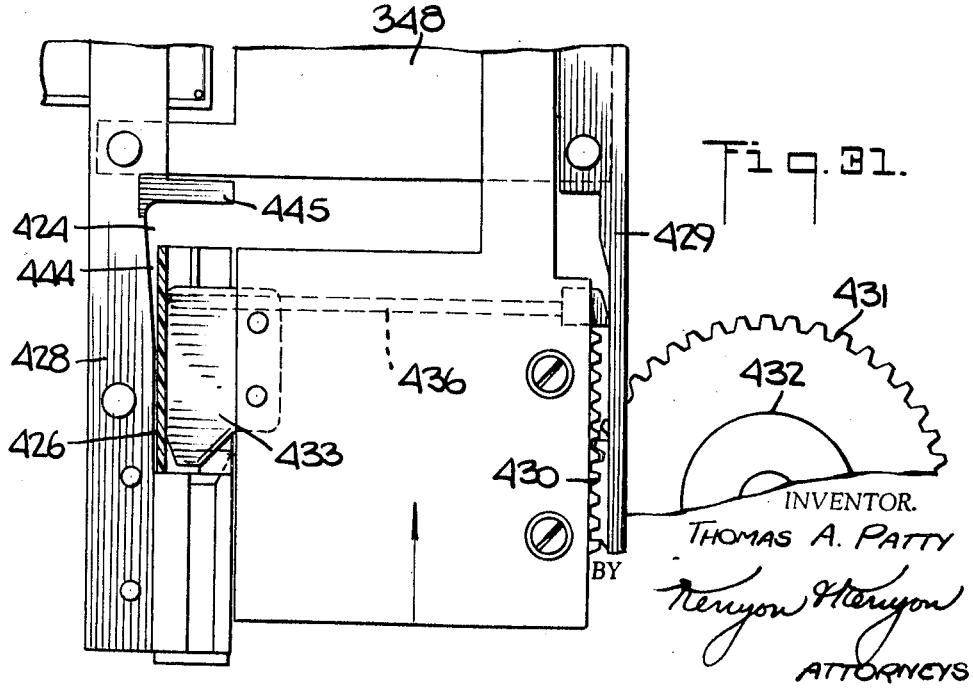

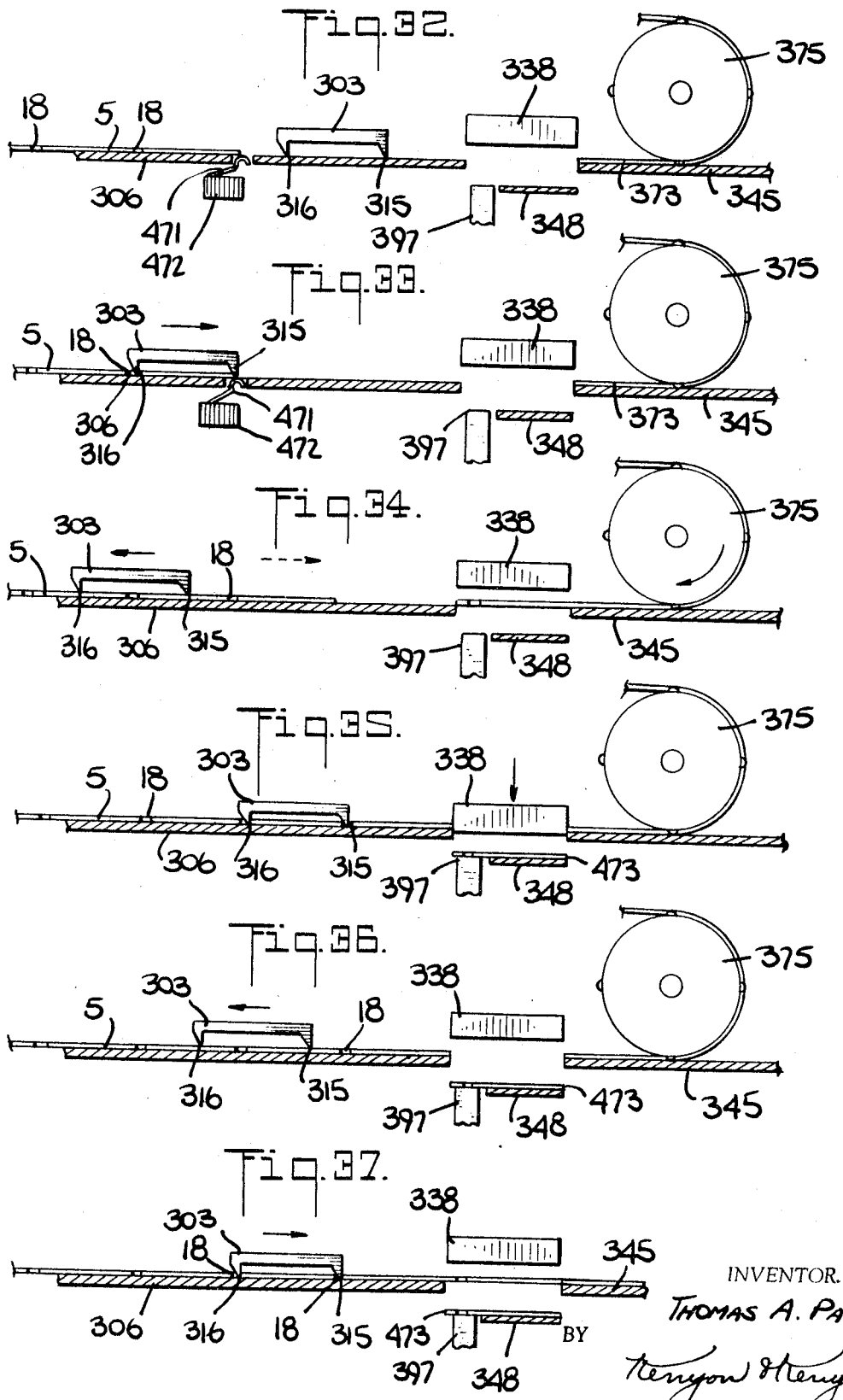

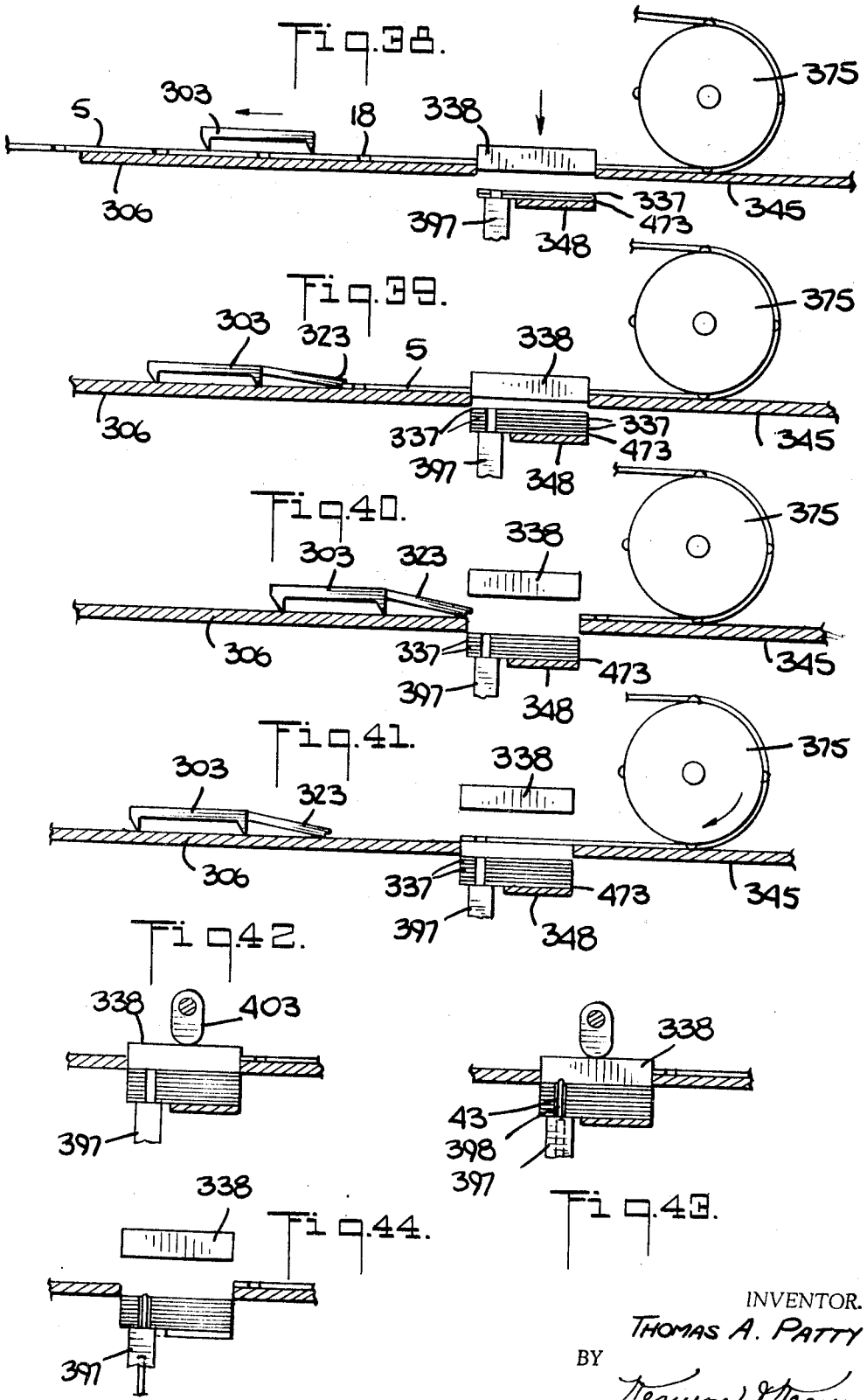

3,513,758
APPARATUS FOR TAKING, DEVELOPING, COMPILING, AND BINDING A SERIES OF PHOTOGRAPHS
Thomas A. Patty, Coral Gables, Fla., assignor to Leonora Mining & Milling Company, Dade County, Fla., a corporation of Utah
Filed Aug. 13, 1965, Ser. No. 479,514
Int. Cl. G03b 29/00
U.S. Cl. 95—1                                5 Claims

ABSTRACT OF THE DISCLOSURE

An apparatus for taking a series of pictures, finishing them, and binding them into the form of a book. The apparatus comprises a camera which will take a series of pictures in rapid sequence. Following this operation, a knife severs the exposed piece of film and it is sent through a developing and drying section, and then into a section where it is cut up into frame sections which are formed into a stack. Subsequently further apparatus places cover material on the stack and the whole is compressed and stapled by a later section of the apparatus, to form the book. All these parts of the apparatus are operated by an automatic control in a sequential pattern.

---

The present invention relates to apparatus for the manufacture of bound booklets of individual rapid-sequence photographs and to related apparatus for taking and developing the photographs in strip form.

In particular the invention concerns a machine arranged to automatically take a rapid sequence of pictures of a subject on strip film, to thereafter develop the exposed strip film into a series of positive prints, to then cut and stack the individual frames of the film strip in the sequence in which they were taken and to bind the same in a permanent cover.

It is a purpose of the instant invention to permit a subject-person to actuate apparatus which will take his picture in rapid time sequence even while the subject is intentionally changing posture, so as to obtain a series of picture frames akin to a strip of movie film, and to thereafter process the film so as to obtain a booklet of the individual picture frames. Such a booklet contains the pictures in the sequence in which they were taken, and by rapidly flipping or thumbing the pages an observe is given the impression of the actual time-sequence movements of the subject. It therefore produces effects akin to moving pictures.

It is also a purpose of the invention to provide such an apparatus that processes the film in a relatively short time and is therefore suited to coin-operation. As such, the instant invention is adapted to continuously, rapidly and automatically perform all the operations from the taking of the pictures to the making and dispensing of the finished dry positives in permanent booklet form.

It is a further object of the invention to provide an apparatus that will receive a strip of film or the like of uniform size and automatically segment the strip into preselected sizes, stack the segments in sequence, staples them together between front and back covers, overlay a protective back-binding and dispense the finished bound product and reset itself for repeating the operation upon command.

It is a further object of the instant invention to provide an apparatus that will perform the desired operations quickly, at low cost, and with very low maintenance.

To attain the above purposes and others which will become apparent hereinafter, I have embodied my invention in a preferred form of which the following drawings are illustrative:

FIG. 1 is a schematic presentation of the interconnected multiple stages of an embodiment built according to the invention.

FIG. 2 is a broken view of a photographic strip of the type processed by the invention.

FIG. 3 is a perspective view of a booklet of a bound stack of sequential photos processed according to the invention and separately showing the positioning of an exterior binder clip.

FIG. 4 is a perspective view of a completed booklet similar to that of FIG. 3.

FIG. 5 is a cross-sectional view of the completed booklet made according to the invention and taken along lines 5—5 of FIG. 4.

FIG. 6 is a partially cut-away front view of the picture-taking stage of the apparatus of the invention.

FIG. 7 is a cross-sectional view of the film strip cutting device of the picture-taking stage as it would appear in a view transverse to that of FIG. 6.

FIG. 8 is a cross-sectional view of the film-developing stage of the apparatus of the invention.

FIG. 9 is a broken cross-sectional view of the film-drying stage of the apparatus of the invention.

FIG. 10 is a partial cross-sectional view of the main drying chamber of the film-drying stage as taken along lines 10—10 of FIG. 9.

FIG. 11 is a cross-sectional view of a film-track conduit of the film-drying stage as taken along lines 11—11 of FIG. 9.

FIG. 12 is a front view of the apparatus of the booklet preparation stage of the invention.

FIG. 13 is a top view of the apparatus shown in FIG. 12.

FIG. 14 is a side view of the apparatus of the booklet preparation stage as seen from the right in FIG. 12.

FIG. 15 is a partial cross-sectional view of the strip-cutting assembly and related apparatus of the booklet preparation stage as seen along lines 15—15 of FIG. 14.

FIG. 16 is a partial bottom view of the apparatus of the booklet preparation stage of the invention.

FIG. 17 is a partial perspective view of the apparatus of the booklet preparation stage that generally corresponds to the upper portion of the view of FIG. 12.

FIG. 18 is a horizontal sectional view taken along lines 18—18 of FIG. 13 and showing switch means and related actuating means for effecting the sequential steps of the apparatus of the booklet preparation stage.

FIG. 19 is an enlarged horizontal sectional view taken along lines 19—19 of FIG. 13 and showing a preferred movement means for feeding cover material for preparation of booklets.

FIG. 20 is an enlarged horizontal section view taken along lines 20—20 of FIG. 13, and also in partial section, showing details of apparatus related to feeding of cover material for preparation of booklets.

FIG. 21 is a horizontal sectional partially cut-away view of the booklet preparation apparatus taken along lines 21—21 of FIG. 13.

FIG. 22 is a view similar to that of FIG. 21 but showing the relative positions of the apparatus at a different stage of the process.

FIG. 23 is an enlarged view of a portion of FIG. 22 and shows a booklet in more advanced stage of assembly vis-a-vis FIG. 22.

FIG. 24 is a horizontal sectional view corresponding to the apparatus of FIG. 22 but showing the relationship at a stage of assembly more advanced than FIG. 23.

FIG. 25 is a view like FIG. 23 but showing a stage of assembly more advanced than FIG. 24.

FIG. 26 is a view like FIG. 25, but showing a more advanced stage of assembly.

FIG. 27 is a view like FIG. 26 but showing an even more advanced stage of assembly.

FIG. 28 is an elevation sectional view taken along lines 28—28 of FIG. 22 showing details of apparatus for stacking, binding and ejecting booklets.

FIG. 29 is a view similar to that oof FIG. 28 but showing a stacked and stapled booklet in position to receive a binding clip.

FIG. 29 is a view similar to that of FIG. 28 but ing the apparatus at a stage where the booklet has received a binding clip.

FIG. 31 is a view similar to that of FIG. 30 but showing the apparatus at a stage where the booklet has been rejected from the apparatus.

FIGS. 32 through 41 are schematic views of the film advance, cover advance and resulting assemblies showing the positioning of these assemblies in various sequential stages of the operation of the booklet preparation assembly.

FIGS. 42, 43 and 44 show three sequential schematic views of the stack assembly and stapling operation of the invention.

FIG. 45 is a chart showing the time sequence of operation of the listed electrical elements in the booklet preparation assembly.

FIG. 46 is a horizontal sectional view taken along lines 46—46 of FIG. 21 and showing details of the booklet assembly apparatus at an early stage in the process.

By specific reference to FIG. 1 one sees the interrelation of the various steps or stages in an overall system embodying the invention. Preferably, the system is a self-contained coin-operated machine. Hence, as shown, there is a coin box for actuating the Main Control. The latter contains the primary power supply, circuitry and electronic switching gear for energizing and de-energizing the various units in the other stages in the proper sequence.

There are many ways known for automatically taking photographs in strips. One method, and the preferred way insofar as the instant invention is concerned, is schematically represented in FIG. 1 by the boxes marked Strobe Unit, Film, Camera and Photo Control.

The Strobe Unit is merely a strobe light that performs the functions of a light source for proper illumination of the subject, and is, in effect, a shutter for the camera lens. The strobe light is activated a given number of times in rapid sequence. During this time the camera unit, as will be explained more fully hereinafter, is advancing an unexposed film strip 5 past the lens, with the result that an exposure is registered with each flash of the strobe unit.

The box marked "Film" in FIG. 1 represents a film supply, much as a continuous roll, that is supplied to the box labelled "Camera" upon command of the Photo-Control unit, a subsidiary control of the Main Control. The Photo Control actuates the camera thereby causing a strip of film to advance past the lens at a rate suited to obtain separate image exposure with each flash of the strobe.

The exposed film which has separate images 41 as indicated in FIG. 2 (but undeveloped) advances to the Unit marked "Dev. Wash" of FIG. 1. Here the film, which is of the positive type, is developed and washed. From there the film strip passes through a Dryer Stage and is processed into a bound booklet of individual sequential photos by the Stapler Unit, which is controlled through the Stapler Control, another subsidiary of the Main Control. A finished booklet 42 is, for example, illustrated by FIG. 5.

Inasmuch as the instant invention is most particularly concerned with the actual apparatus for automatically handling of the film from the exposure stage through the booklet preparation stage, I hereinafter discuss in detail a device especially suited to these functions.

FILM-CAMERA STAGE

By reference to FIG. 6 there is shown a camera unit 1 which is in proximate relation to a film supply unit 2 wherein a roll 3 of film 5 is stored on a spool. The film 5 is threaded through the common port 6 between the camera unit 1 and the film unit 2 and into the interior chamber 7 of camera unit 1 where it follows tracks in the walls of the chamber as shown more specifically hereinafter with reference to FIG. 7. The film 5 is initially threaded between two pressure rollers 8 and 9 past a microswitch 10 and up to point A, which represents the forward cutting plane of a solenoid powered knife 11.

Threading of the film between the opposed pressure rollers 8, 9 is facilitated by having roller 9 disengage by pivoting out of position in response to a pull on a spring biased external knob 12. Thus, roller 9 is pinned at 12 to a lever arm 13 which has a fixed pivot 14 at one end and a free pivot 15 at the other, which, in turn is connected to an external knob 12 through interconnecting member 17. The latter carries a coiled spring 16 for biasing the roller 9 against roller 8 and the interposed film 5. A pull on knob 12 lifts roller 9 out of engagement with roller 8, thus permitting easy threading of the film.

The roller 8 is connected to a motor and hence roller 8 provides the motive power for advancing the film 5 in the camera unit. The motor connected to roller 8 is activated by the Main or Photo Control in response, say, to the insertion of a coin. As the film 5 is driven by the rollers 8, 9 in the direction indicated by the arrows, the leading edge of the film, which initially was threaded to point A, is thrust past the aperture cavity 13 in back of the fixed lens 14. The film 5 is held rigidly in its focal plane by tracks, and, if necessary, by flat springs.

While the film is in the proper plane with respect to the objective, the strobe unit (not shown) is activated by microswitch 10 in a manner hereinafter explained, and the image of the subject who is positioned opposite the lens 14, is photographically transferred to the film. The speed of the strobe light is such that a sharp image is obtained even though the film is continuously moving by virtue of motorized roller 8.

The camera unit 1 has no conventional shutter, since the strobe light is suited to perform this function as well as the function of subject-illumination. In this sense the camera unit, lacking a shutter, is not really a camera, and some may prefer to refer to it as an image condensing unit. Nonetheless, for the purposes of this invention, I will continue to refer to the unit as a camera.

As shown in FIGS. 2 and 3 the film 5 contains prepunched slots 18 on either side. The slots 18 are so placed along film strip 5 that the distance between them constitutes one image length, i.e., the distance between the beginning of one image 41 and the beginning of the succeeding one. Microswitch 10 has a contact arm 19 adapted to ride the film in line with the slots 18 on one edge.

As arm 19 of microswitch 10 rides over a slot 18, electrical contact is made against the underlying surface on platen 20. This contact activates the strobe unit so as to expose the film 21 placed in the focal plane of the objective 14. The picture having thus been taken, the film continues to be fed past the objective and successive pictures are taken each time the arm 19 of microswitch 10 makes contact through a slot 18 in the advancing film 5.

An number of pictures or exposures may be made in the above manner. However, inasmuch as the ultimate product is a bound booklet of pictures, due regard must be had for the sizing of equipment all down the line. I have found that a strip of 25 frames to yield a most pleasing and satisfactory product and hereinafter the invention will be explained and described using 25 frame strips by way of example.

In addition to the function of microswitch 10 as pointed out above, this switch is also connected to a stepping switch which is set to make 25 counts. As each frame is exposed by the Strobe Unit, the stepping switch (not shown) advances another step. When 25 counts or impulses have been made, the stepping switch cuts off the power to the drive motor of roller 8, and energizes a magnetic brake (not shown) that instantly halts the shaft of roller 8.

Simultaneously with the stopping of the roller 8, the film 5 is cut by a knife 11, the apparatus for which is shown partially in the non-sectioned portion of FIG. 6 and partially in FIG. 7.

The knife assembly comprises a knife blade 11 that is connected to the middle portion of a lever arm 22 which is pivotally fixed at one end 23 to a stabilizing block 28 and is freely pinned to a transverse lever 25 at its other end by pin 24. Lever 25 is the plunger arm of a solenoid 26 that is firmly mounted by screws 27 to the frame 28 of the camera unit 1.

Attached to the plunger 25 is a coiled spring 29 whose other end is attached to a stud 30 on the frame 28.

Referring to FIG. 7, it is seen that the edges of the film 5 reside in tracks 30 of the frame 28 and in close proximity to the forward edge 31 of the knife 11. Facing the knife edge 31 is a cutting block 32 which has a niche therein forming an edge 33 against which the knife edge 31 may shear the film 5 in a scissoring action. The knife solenoid 26 is initially activated by the Main Control or Photo Control simultaneously with the drive motor on roller 8. When activated, the solenoid 26 draws in the plunger 25 which results in the knife edge 31 being removed from the film path, thereby assuming the position indicated by the solid lines in FIG. 7. The solenoid is kept in circuit until the stepping switch referred to above has sensitized 25 impulses corresponding to 25 frames of film. Upon this event, the stepping switch takes solenoid 26 out of circuit. As a result, the now free solenoid plunger 25 is snapped forward by spring 29 thus forcing the connected knife 11 to cut the film in a scissors action between the knife edge 31 and the cutting block 32. This position is indicated by the dotted lines in FIG. 7. The leading edge of the first frame of the next film strip is now at point A as before.

During the advancing of the 25 frames of film 5 prior to its being cut, the exposed frames 41 are taken up inside camera unit 1 by curving around stanchions 34, 35, 36 and along tracks between them as indicated at B. The motive force for this movement comes, as stated before, from driving roller 8. By following the path indicated by the arrows, the exposed film is given a residence time such that when the stepping switch has signaled the last or 25th frame and the film is thereupon cut, the leading edge is positioned at point C between two pressure rollers 100, 101 which constitute the film drive means for the next stage—developing.

IMAGE DEVELOPER STAGE

This stage 103 is depicted primarily by reference to FIG. 8. It has a frame 104 similar to that of the Camera Stage except that it is fluid tight for the purpose of containing a developer solution 105. Conveniently the frame 104 is located beneath the Camera Stage and supports the frame 1 of that stage by a set of pins 37 on the frame 1 positioned in complementary seats 108 of a support plate on frame 104.

Unit 103 is divided into two compartments: one 106 contains a developer solution 105; the other 109 contains wash or rinse water 110. These compartments are divided in a fluid-tight manner by the walls 111 and 112.

The remaining elements of the Image Developer Stage are best understood by reference to the method of operation. As mentioned above, before the drive motor on roller 8 in Stage I has been stopped, it has pushed the leading edge of the film strip 5 into engagement with the pressure rollers 100, 101 at the entrance to the chamber 106 of the developer unit 103. The film 5 follows tracks in the walls of the frame 104 along the lines indicated by the arrows. The motive force for this movement comes from the pressure rollers 100, 101. The latter are mated to each other by spur gears (not shown) and one of them, 101, is driven through shaft mounted sprockets 115 by a chain 113 which is driven in turn by a main motor 114. Motor 114 may be conveniently activated by the main control at the same time as the initial apparatus of the Film-Camera Stage. It, however, performs no useful function until the film strip 5 reaches the rotating pressure rollers 100, 101.

The residence time of film 5 in the developer solution is such that the image on the exposed film becomes fully developed. The precise timing of such residence time, as well as the selection of the developer solution is well within the skill of those versed in the photography art when given the nature of the film.

The developer solution 105 is preferably circulated continuously so as to assure uniform concentration and to add fresh developer as needed. For this purpose the frame 104 is provided with an inlet port 102 and an outlet port 116 for recirculating the developer solution. To this end, a pump and intermediate surge tank (not shown) are used.

After the film 5 leaves the developer solution 105, as at point D, it enters the water wash chamber 109 where it is thoroughly cleansed of developer. Initially the image side of the film is subjected to a forceful spray of water supplied through one nozzle 117 on water inlet conduit 119. The water 110 is collected in the chamber 109 where it is maintained at a maximum level by open drain hole 120. The film is immersed in the water bath 110 and is once again water-sprayed on its image side by nozzle 118.

The film 5 is assisted through the Developer Stage by supplementary pairs of pressure rollers represented in FIG. 8 by two pairs enumerated 121, 122 and 123, 124, respectively. Each supplementary pair is conveniently driven by the chain 113 on main motor 114 that serves to drive the entrance pair 100, 101. The final pair 123, 124 feed the film into a lip-mouthed exit port 125 and into the Dryer Stage. The main drive motor 114 is shut off by a signal sent by a switch in the Booklet Preparation Stage as described hereinafter under that heading.

FILM DRYER STAGE

This Film Dryer Stage is described most particularly with reference to FIGS. 9–11. The broken sectional view of FIG. 9 shows the whole of the dryer unit 200. It comprises a series of interconnected film and air-carrying conduits 201, 202, 203 which interconnect corner blocks 204, 205 and a hot air blower assembly 206.

This latter assembly comprises a hot air chamber 207 through which the film 5 is threaded by means of tracks 208 in the side walls of the chamber 207. Warm air is supplied across both surfaces of the film 5 by means of a hot air blower (not shown) whose effluent emits through a conduit 210 in the direction of the arrows as indicated in FIG. 10 so as to enter the air chamber 207 at a point directly in front of the film. The plane of the film is generally the same as the central air flow so that both sides of the film are equally exposed to the drying medium.

The conduits 201, 202, 203 have, as seen in FIG. 11, a relatively large air space 211 surrounding the film 5 which lays in a gap between pairs of opposed continuous ridges 212, 213. The air spaces 211 in the conduits 201, 202, 203 are in communication with the central air chamber 207 and hence the hot air therein permeates the entire route of the film through the conduits. For ease of fabrication, the cornering of the film, where necessary, is formed in separate cornering blocks 204, 205 into which the straight conduits 201, 202, 302 are fitted.

In the operation of the drying unit 200, the film 5 is forced into the tracks of the initial conduit 201 by means of the last pair of pressure rollers 123, 124 in the developer unit 103. The film is thereupon immediately subjected to the drying influence of the warm air that permeates the conduit through the spaces or passages 211. The rollers 123, 124 continue to push the film between the ridges 212, 213 and into the central drying chamber 207 wherein the hot air from conduit 210 directly impinges along both sides of the film, subjecting it to further drying. Finally the film emerges through the final conduit 203 and exits through corner block 205 into the Booklet Preparation Unit. At this point the film is thoroughly dry and suited for the various handling and stacking operations of the final stage.

BOOKLET PREPARATION STAGE

The Booklet Preparation Stage refers generally to all the apparatus associated with stacking and binding the individual image frames 41 of the dried film strip. It is by far the most complex stage, and its preferred structure is best described with reference to FIGS. 12–46. It requires the sequential interplay of a number of functionally distinct operations, and the correct timing of the performance of each function is centrally controlled by a stepping switch (not shown) which, upon command, energizes one or more individual elements in the over-all combination. In the embodiment of the drawings, the command unit for the stepping switch comprises a master microswitch 331 (see FIGS. 17, 18) having a contact arm 332 which rides a cam 333 fixedly connected to the shaft 321 of the main drive motor 322.

Each revolution of cam 333 by motor 322 closes switch 331 which, in turn, advances the stepping switch (not shown) one step. The stepping switch, in turn, energizes the specific elements whose cooperation with the elements driven by motor 322 are required for that particular step of the overall operation.

The structure of this stage may itself be broken down into the following functional groupings of apparatus:

(a) film advance assembly
(b) frame cutting assembly
(c) cover advance assembly
(d) stapler assembly
(e) binding assembly
(f) booklet ejector assembly The primary function of this stage is to take a strip of film, and to automatically cut it into individual frames, stack the frames in sequence between protective covers, affix the frames together in booklet form, eject the booklet, and reset itself for a repeat operation upon command. These functions are carried out in the general sequence outlined above, each of which is hereinafter described in detail with reference to the preferred embodiment depicted in the drawings.

By reference to FIGS. 13, 16, 17, 21 and 46 there is shown a slide assembly 300 as a portion of the apparatus. This slide assembly 300 has a generally rectangular slide carrier 301 having a slide track 302 carrying reciprocal slide 303 on attached runners 304 which are vertically stabilized by fixed bars 305.

Between the runners 302 is a grooved area 306 (see FIG. 17) which forms a track for the receipt of a strip of film, as shown in FIG. 13. The body 303 of the slide carries one pair of finger bars 307, 308 symmetrically disposed on opposite sides of the body 303 toward its forward end and also another like pair 309, 310 located near the back end of the slide body. The finger bars 307, 308, 309, 310 are pivotally attached to body 303 by means of pins 311, 312, 313, and 314, respectively. Each finger bar of the forward pair 307, 308 has a downwardly disposed finger end 315, and the rear set 309, 310 has similar downwardly disposed finger ends 316. These finger end 315, 316 are disposed from each other by a distance corresponding to one or more frames 41 and adapted to periodically engage in the aligned slots 18 of film 5 in the manner and for the purpose described more fully hereinafter under Operations, and to otherwise ride on top of the film 5. When engaged in a slot 18, the finger ends 315, 316 are disposed in relief grooves 329, 330 recessed in the bottom of the film groove 306 as shown, for instance, in FIG. 21.

The slide body 303 is moved in the slide path in response to lateral movement of an adjustable bar 317 which is pivoted to the rear end of the body 303 by pin 318. Bar 317 is pivotally connected at its other and forward end by a pin 319 to one end of a lever arm 320. The lever arm 320 is fixedly mounted at its other end to a shaft 321 connected to a main drive motor 322.

Projecting forwardly from the bottom of slide body 303 is a flat plate 323 which has one end pivotally attached to body 303 by a pin 325 and has a tongue portion 326 extending beyond the front wall 327 of the slide body 303 and terminating in a notch 324 at the bottom of its other end. The bottom of plate 323 is adapted to ride directly over the film strip 5 with a slight downward pressure provided by its own weight and the aid, if necessary, of a small leaf spring 328. Plate 323 serves the function of advancing the last frame of film into the frame cutting assembly as described more fully hereinafter.

For purposes of assuring alignment and stability of the film as it is fed by the slide assembly 300 into the successive frame cutting assembly there is provided one or more rigid hold-down plates 334 which reside just above the plane of the film 5. The hold-down plates 334 may be attached to bars 335 affixed to slide carrier 301.

As mentioned above, the primary function of the slide assembly is to advance the film 5 strip in the groove 306 to the frame cutting assembly, frame by frame. The frame cutting assembly itself is best shown by reference to FIGS. 12, 13, 17, 21, 22 and 24. It has a rectangular cavity 336 in the table frame 345 for receiving, cutting and stacking of the film frames 41 and the booklet covers 473 (see FIG. 21). The cavity 336 is positioned directly in the film track or groove 306 and has a width corresponding to the width of the film 5 and a length corresponding to the length of a single frame 41 of film. The depth of the cavity is such as to readily accommodate a stack of film frames of the desired number with some room to spare. The walls 346 of the cavity 336 extend below the depth of the table frame 345 by additional member 347. The cavity 336 has a solid floor 348 for supporting the stacked frames, such floor being solid except for two small openings (see FIGS. 21, 28): one 319 for accommodating the upwardly turned head 350 of a stapler 351, and the other 352 for accommodating the clips 353 of a safety latch device whose structure and function is explained more fully in connection with the ejector assembly below.

The position of the rectangular cavity 336 with respect to the slide assembly 300 is such that, in operation, a single frame 337 of film is moved by the slide assembly directly over the mouth of the cavity as shown, for example, in FIG. 21.

Directly above the cavity 336 in table 345 is a cutting block 338 attached by screws 339 to a tamper block 340. Tamper block 340 is connected to an upright plate 341 which is vertically slideably engaged between grooved members 342, 343 which, in turn, are attached by a vertical support 344 to the base table 345.

The cutting block 338 is shaped to be receivable within the cavity 336 and in such close engagement therewith that parallel edges 354 and 355 make a cutting action against the corresponding edges 356, 357 at the lip of cavity 336 when the cutting block is moved downwardly from its raised position (FIG. 21) to its recessed position (FIG. 22).

The latter described vertical reciprocal movement of the cutting block 338 is achieved in the embodiment shown through a tamper lever arm 358 which is centrally pivoted by pin 359 to a base supported member 360. Tamper arm 358 has one end 361 positioned over a stud 362 in the vertically slideable plate 341 an the other end 363 attached to an adjustable wheel 364 adapted to ride tamping cam 365 on shaft 321 of main motor 322. Briefly stated, as the motor rotates the cam 365 in the counter-clockwise direction, the wheel 364 engages the apogee of the cam 365 thrusting end 363 of the tamper lever 358 upward and end 361 downward against stud 362, which, in turn, plunges cutting block 338 into cavity 336 via interconnecting members 341, 340 (see FIG. 22). In so doing, the cutting block 338 acts as a punch for cutting frame-sized segments of material thrust over the mouth of cavity 336 by either the slide assembly 300 referred to above or the cover advance assembly to be described hereinafter.

In order to stabilize the tamper lever 358 in position during its inactive moments, there is preferably provided, as shown in FIG. 17, a resilient bumper 366 against which the upper surface of 361 of tamper lever 358 rests. The bumper is shown to be conveniently supported on a member 367 affixed to vertical support 344.

The tamper block 340 and connected cutting block 338 are biased upwardly by a spring means which serves to return these elements to their raised position (FIGS. 17, 21) when the downward pressure of end 361 of lever 358 is released. Conveniently, the spring means may be that shown in FIG. 24. There is depicted a coiled spring 368 which has one end attached to the moveable tampering block 340 through an imbedded stud 369 and has the other end attached to a stud 370 imbedded in fixed support member 344. A slot 371 in the support 344 provides movement room for the raising and lowering of the stud 369.

It is readily seen (FIG. 17) that since tamper cam 365 is fixed to shaft 321, the tamper lever 358 reciprocates the tamper 340 and cutting block 338 one with each revolution of the shaft 321 and hence once for each activation of the master stepping switch by microswitch 331 and also once for each horizontal reciprocation of the film advance slide 303. The relative positions of the cam 333 and cam 365 and arm 320 on the shaft 321 are obviously important to the timing of the separate but inter-related operations played by the mechanisms attached to each. Hence, during the film cutting operation it is important that cam 365 not cause the covering of cutting block 338 before arm 320 has caused the slide assembly 300 to advance film 5 over the cavity 336. Further, it is important that cam 333 not cause the stepping switch to advance before the cutting block 338 and the slide 303 have completed their tasks for that revolution of the shaft 321. These inter-relationships will be dealt with in more detail when the overall operation is discussed below.

The cover advance assembly is analogous in many ways to the film advance assembly. Its object is to insert a continuous strip of cover material over the cavity 336 so that the same may be punched out or cut to the frame size. However, as opposed to the film advance assembly, the cover assembly need obviously advance the cover material only twice—once for the front cover, and once for the back cover. Further, the timing of these two operations must be such that the front cover is cut and laid in position at the bottom of cavity 336 before the first frame of film has been cut and such that the last image frame 41 has been stacked before the bottom cover is cut. This timing is controlled by the positioning of the cavity with respect to the advance mechanisms and the activation of elements by the stepping switch. These inter-relations will be fully treated in the discussion of operation at a later point.

The cover advance assembly may be generally understood by reference particularly to FIGS. 12, 13, 14, 17, 19, 20, 21 and 22.

Referring specifically to FIGS. 14 and 17 there is located above the table lever on a suitable framework a supply roll 372 of continuous cover material 373 having slotted portions 374 therein in the same relation as slots 18 in the film strip 5. Preferably this cover is composed of any of the well-known clear flexible plastic sheet materials.

The cover material 373 is threaded from the supply roll 372 to a dispensing drum 375 via guide bars 376 and 377. The dispensing drum has a series of spaced paired fingers 378 which are adapted to engage with the corresponding spaced slots 374 in the plastic 373. The plastic strip between succeeding fingers 378 corresponds to one frame length, and hence, one cover.

The dispensing drum 375 is mounted on a shaft 379 which is coupled through a Geneva mechanism 380 to a drive motor 381. The Geneva mechanism 380 is shown more particularly in FIG. 19 and it constitutes a convenient and reliable means for periodically rotating the shaft 379 of drum 375 through a measured partial turn corresponding precisely to a movement of one cover length of material, i.e., a rotation of 90° for the embodiment shown. More specifically, FIG. 19 shows a driven wheel 382 having four radial slots 383 located 90° apart, and a driver wheel 384 which carries a roller 385 adapted to engage one of the slots 383 each time the wheel 384 makes a revolution. This results in the driven wheel 384 turning one-quarter of a revolution. The concentric surfaces 386 engage the concave surfaces 387 between each pair of slots 383 before the driving roller 385 is disengaged from the driven wheel 382, which prevents the latter from rotating while the roller 385 is moving around to engage the next successive slot. Concave surfaces 388 are provided on wheel 384 to accommodate the concave surfaces 389 of the driven wheel 382.

The driver wheel 384 is rotated on a shaft 390 by a motor 381. The latter is stopped after one full revolution by a microswitch 393 whose riding arm 392 breaks the circuit by stepping into notched area 391 on the perimeter of wheel 384. Motor 381 is activated in the first instance, and at the appropriate moment, by the master stepping switch.

Thus, with reference to FIG. 20, it is seen that each time motor 381 rotates one revolution the coupled dispensing drum 375 feeds one cover's length of cover material towards the cutting assembly in the direction indicated by the arrow. The dispensing drum 375 preferably has associated therewith alignment means constituting a guide 477 which centrally circumscribes a large portion of the drum. Conveniently, the guide is held in place by a back plate 478 which is affixed at both ends to side support plates 394, 395. In addition, in the vicinity where the carrier material 373 is fed off the dispensing drum 375 there is provided plate 396 which is raised slightly to permit the cover material 373 to be slid underneath for accurate guidance to and over the associated and proximate cavity 336 of the cutting assembly.

The latter assembly, described above, performs the same function with respect to the cover material 373 as it does with the film strip 5. It is, of course, oblivious as to which of the two is being fed to it an any given time. However, when a complete series of pictures or frames has been cut and stacked in the cavity 336 and covers have been provided on the bottom and top, the stepping switch calls into play the stapler assembly. This assembly utilizes many of the components already discussed, but for different functions.

Basically, the stapling operation involves the firm compaction and stabilization of a completed picture stack while a conventional stapler machine staples the whole firmly together. The means for accomplishing this in an automatic way, and at the proper time, and with compact low-maintenance equipment calls for some ingenuity. The solution of the invention is best understood by reference to FIGS. 12, 14, 16, 23, 24, 25 and 29.

The stapling operation is performed in the cavity 336 by means of a stapler 397. The stapler 397 is conveniently attached to the bottom of the table 345 (see FIGS. 12, 14, 16) so that its head 350 is projecting upwardly into the opening 349 in the floor 348 of cavity 336 (see also FIG. 22). The alignment of the head 350 is such that the staple 398 in position for stapling is directly opposed to and hence receivable into the coaxially aligned pre-punched holes 43 in the cover-picture stack 44 in cavity 336 (see FIGS. 22, 23).

The magazine 399 of the stapler is carried by the bottom of table 345 out to its edge where loading is easily accomplished. The stapler is actuated by an upward thrust on its feed plunger 400, the thrust being provided by an actuating mechanism generally given the legend 401 (see FIGS. 12, 14) and described more fully hereinafter.

The apparatus for holding the stack 44 in position during the stapling operation is best described by reference to FIGS. 22, 23, 24.

As shown in FIG. 22, the cutting block 338 is recessed considerably into the cavity 336 at the depth of its plunge as caused by tamper arm 358. As the number of frames build up in cavity 336, the top frame of the stack approaches the bottom of the cutting block. When the stack is complete, the under-surface of the cutting block 338, when at the bottom of its cycle, firmly compresses the entire stack 44. Any adjustments required to assure this condition can be made to the adjustable wheel 364 on the tamper arm 358.

Now, during the stapling operation, the tamper 340 and the attached cutting block 338 are, as opposed to their normal cyclic operation, caused to be locked in the downward position, thereby compressing the entire stack 44 together on a continuous basis. The preferred mechanism for locking these assemblies downwardly in the nature of a press is described with reference to FIGS. 12, 15, 17 and 46.

Located generally above the top edge of vertically slideable plate 341 is a shaft 402 which extends through and is rotatable in stabilizing member 367 and support plate 344. A locking bar 403 is secured to one end of the shaft 402 and is located in generally the same plane as the slideable plate 341. The length of the locking bar 403 is such that it extends to and contacts the upper surface of the slideable plate 341 when the latter is at or very near the bottom of its vertical descent (see FIG. 24).

Normally, locking bar 403 is held in a generally horizontal alignment and spaced apart from the slideable plate 341 (see FIG. 46). However, during the stapling and binding operations, apparatus is brought into play which rotates shaft 402 and the attached locking bar downward into the vertical locking position.

This latter action is performed through the mechanism shown primarily in FIG. 15. There is depicted a solenoid 404 having a plunger 405 adapted to move in the up and down direction. The plunger 405 is attached to a vertical rack 406 which engages a pinion 407 mounted on horizontal shaft 402. When solenoid 404 is actuated it pulls rack 406 down, resulting in rotation of the shaft 402 and hence the locking bar 403. The length of stroke of the solenoid 404 and the teeth spacing on the rack 406 and pinion 407 is naturally selected so as to rotate the shaft through the proper number of degrees to make locking bar 403 arrive at its vertical locking position. A vertical tension spring 408, which is attached at one end to rack 406 and at the other end to a stable stud 409, acts to return the rack and plunger, and hence the interconnected locking bar 403, to their normal positions when solenoid 404 is deactivated. The latter event takes place through the action of the master stepping switch at the proper time, as described hereinafter.

It is thus seen that when the locking bar 403 holds the tamper apparatus down, the stacked frames and covers 44 in cavity 336 are firmly held and buttressed for the action of the stapler 397 (see FIG. 24). The lower face of the cutting block 338 constitutes an anvil that is provided with concave slots 410 to receive and inwardly turn the ends of the staple 398 (see FIGS. 46, 24) when the latter is forcefully emitted through the action of the staple actuating mechanism 401.

Mechanism 401 is a combination of elements adapted to operate the stapler 397 upon command. It comprises (see FIGS. 12, 14) a horizontally positioned solenoid 411 having a plunger 412 which is attached via connector 422 to rack 413. Rack 413 is reciprocally slideable in a track 414 of a base member 415, and its gears mate to a first opinion 416 that rides on horizontal rotatable shaft 417 carried by base 415. Coaxially fixed to shaft 417 is a second pinion 418 which meshes with vertically aligned rack 419. The latter moves in a vertical track 420 in base 415 and is aligned with and pinned to the plunger 400 of the stapler 397 by pin 421.

It is thus seen that an inward stroke of solenoid plunger 412 in response to actuation of solenoid 411 causes horizontal rack 413 to move towards the solenoid 411 and to rotate shaft 417 by means of the affixed pinion 416. The shaft 417 in turn rotates second pinion 418 causing mated rack 419 to forcefully move upward, depressing plunger 400 and forcing staple 398 through the pre-cut and pre-aligned holes 43 in the covers and image frames. Anvil slots 410 turn the staple ends in, thus firmly securing the stack 44 together.

Thereafter the cooperating binding assembly apparatus comes into play. By "binding," I mean the placing of a permanent protective shield across the back edge of stack 44 so as to make a booklet 42. Such a shield is, according to my invention, conveniently constituted by a semi-rigid plastic clip, such as shown by reference 40 in FIGS. 3, 4 and 5. It is a generally U or bracket-shaped element having a back 38 and two sides, 39, the latter being slightly tapered towards each other at their free ends so as to obtain the biting spring action of a clip (see FIG. 3). Channels 41 are provided in the sides 39 so as to accommodate the staple 398, as shown in FIG. 5.

A multiplicity of clips 40 are loaded into a chute 423, which terminates in the vicinity of and in the same plane as the bottom 348 of cavity 336. Adjacent to the bottom of the chute 423 is a chamber 424 which is proximate to the booklet stapling cavity 336 and which contains the lead clip 425 (see FIG. 28). Follow-up clip 426 resides at the bottom of chute 423.

Looking now to the area of the cavity as seen in FIG. 28, it is seen that a large part of the cavity defining members 347 is formed by unitary carriage member 427 which is horizontally slideable between stationary side members 428, 429 and on bottom 348. Movement of carriage member 427 is brought about through a rack 430 thereon which is mated to a pinion 431 on the shaft of reversible ejector motor 432.

Inasmuch as a stapled booklet 44 resides within the cavity formed by the rectangular cut-out in slideable member 427 (see FIG. 29), it is evident that a lateral movement of member 427 carries the booklet with it. The purpose behind this will become obvious as more details concerning the binding assembly are discussed.

Attached to the slideable member 427 and initially projecting horizontally into the chamber 424 of lead clip 425 is a tongue bar 433 which in elevation view (FIG. 26) has a generally wedge-shape with the narrow end 434 projecting towards the bottom of the chute 423, and which, in plan view, has a rectangular form with an inwardly beveled nose 435 at the narrow end 434 (FIG. 28). This shape is adapted to be easily insertable between the sides of a clip and to simultaneously engage and slightly flare the sides as described more particularly later on. Tongue bar 433 in fact serves as the support for lead clip 425, there being no bottom in chamber 424.

The slideable member 427 also carries a pin 436 that traverses through a transverse boring 438 in member 427. One end 439 of pin 436 is insertable into the chamber 424 and is adapted to abut against the back 38 of lead clip 425 and force it towards the slightly depressed back wall 44 of the chamber 424. This is shown in FIG. 28. This assures that the back edge of a booklet will not accidentally catch on the back 38 of the clip 425 when the booklet is inserted into it in accordance with the operation described below.

The other end 437 of the pin 436 abuts against the side wall 440 of stationary member 429 and is biased there by means of a circumscribing coil spring 441 in an enlarged recess 442 of boring 438. End 437 is shaped so that it can readily slide along side-wall 440 as the pin is moved laterally by its carrier, member 427. Preferably wall 440 is provided with an inclined step 443 that permits end 439 of pin 438 to withdraw slightly when carriage member 427 is moved forward in the direction of the arrow in FIG. 29. This modification permits the pin to be later returned to the initial position as given in FIG. 28 without encountering obstructions.

Another safety feature is the provision of a depression plate 445 interposed between cavity 336 and chamber 424 and hence directly between the mouth of lead clip 425 and the corresponding lead edge of stapled booklet 44 (see FIG. 29). This plate overlies the top of the booklet and serves to keep it firmly compressed as the booklet is moved into the mouth of clip 425 in response to forward movement of carriage member 427.

As mentioned before, carriage member 427 is reciprocally moveable in response to reversible motor 432 and its interconnecting rack and pinion 430, 431. The motor 432 is energized by the master stepping switch in accordance with the planned sequential program. It moves carriage 427 forward in the direction of the arrow in FIG. 29. After completion, the operation of inserting the carried booklet 42 into the clip 425, the motor is reversed by means of a microswitch 446 which is actuated by contact with the forward edge 447 of the carriage 427. The carriage is thereupon returned to its home position where the motor 432 is stopped by carriage contact with microswitch 448 (see FIG. 16). The carriage is stabilized by set-screw 474.

The ejector assembly is a means for removing a completed booklet 42 from the apparatus and delivering it to the operator-subject. The preferred apparatus for accomplishing this is best described with reference to FIGS. 12, 16, 17, 21 and 30.

FIG. 30 shows the position of the binding assembly at the completion of that operation. It is noted that there is no real support for completed booklet 42 as it appears in FIG. 30. That is, the sole previous supports, namely floor 348 and tongue bar 433 are out of their support position. Although theoretically free to fall out of the rectangular notch in carriage 427, the booklet 42 may nonetheless frequently catch against the closely machine walls 346 of the carriage 427 and hence be prevented from falling free.

Thus, according to the invention, the booklet is automaticaly delivered a downward blow to free it from any possible obstructions. This is brought about by a hammer 449 whose head 450 overlies the booklet 42 and is accessible thereto through a hole 451 in the table 345. The hammer 449 has an arm 454 that is pivotally fixed at one end by a pin 452 to base member 453. Pivotally atached to arm 454 intermediate its ends is one end of a transverse bar 455 whose other end is pinned to the plunger 456 of a solenoid 457 mounted underneath the hammer arm 454. Thus, upon activation, the plunger 456 of solenoid 457 forcefully pulls down hammer 449 through connecting bar 455. The hammer head 450 descends through hole 451 and strikes booklet 42 free of the binding apparatus. The booklet falls into a chute for dispensing the same to the subject-operator.

Allied with the binding assembly is a safety-latch mechanism which facilitates the smooth continuous operation of the device. This safety latch is referred to generally in drawings by reference number 458, and is best described with reference to FIGS. 16, 23, 28 and 46.

With particular reference to FIGS. 16 and 46, there is shown a pair of identical base-supported depending bars 459 which are interconnected by rotatable shaft 460. Mounted on shaft 460 at a point intermediate its ends is a bar 461. One end of bar 461 comprises two forked tongues 462 each of which have a lip 353 adapted to project slightly through recess 352 in bottom 348 of cavity 336 and to there closely abut against the proximate wall 346 of that portion of cavity 336 defined by movable carriage 427.

Rotatably pinned between the two tongues 462, and exposed to view in the cross-section of FIGS. 23–27 and 46 is a finger 463. Finger 463 is biased to rotate on pin 464 in a counterclockwise movement by a spring 465 interconnecting one end of finger 463 to the central body of bar 461. The counter-clockwise movement of pin 463 is limited by the bottom of carriage 427 (FIG. 46), or by a stud 466 between tongues 462 (FIG. 26) depending on the particular stage of operation.

The tongues 462 with upwardly projecting lips 353 are biased up against the carriage 427 by means of a coil spring 467 which interconnects the opposite end 469 of bar 461 with the depending bars 459 at a point 468 below the shaft 460.

When tongues 462 are not otherwise limited in their movement by carriage 427, they are retained in approximate horizontal status by a pin 470 depending from table 345.

The latch apparatus thus described, as will become evident hereinafter where the operation of the entire device is discussed, serves the specific function of assuring that moveable carriage member 427 is at all times held precisely in place during those periods when its movement is not called for.

Another optional feature of the invention are counters 474 and 475. One counter 474 can be used to count the cumulative number of booklets dispensed for record purposes. The other counter 475 can be pre-set at a certain number and connected so as to shut down the entire machine when the film supply has been exhausted. Both counters are easily actuated by operative connection to microswitch 446 or 448.

OPERATION OF BOOKLET PREPARATION STAGE

Having thus described in detail the apparatus of a preferred embodiment of the booklet preparation unit of my inventioin, I will now describe its operation so as to better understand the complex inter-relationships of the co-operating combinations of elements. The operations of the Camera, Image Developer and Drier Stages have been adequately treated above, and the discussion hereinbelow is confined to the booklet preparation stage which, as is evident, can be used independently of the specific preceding stages described and is therefore useful with any process calling for the automatic preparation of booklets from materials in consecutive strip form.

The step-wise procedure of the booklet preparation stage is best explained with the aid of the drawings and especially of schematic FIGS. 32–44 as well as sequence chart FIG. 45.

Referring firstly to FIG. 13, there is shown a film strip 5 which is inserted into track 306 of the slide assembly 300 by the pushing action of rollers 123, 124 in the Image Developer Unit (FIG. 8). As the film 5 passes along the track 306 alignment it comes into contact with the contact arm 471 of feed microswitch 472 thereby closing the switch (FIG. 16). This energizes main drive motor 322 of the booklet preparation stage, and also shuts off the main drive motor 114 of the Image Developer Stage. This tripping of switch 472 by the film 5 is indicated schematically in FIG. 32.

Thereafter the rotation of shaft 321 on motor 322 brings into play the sequencing operation of the master stepping switch in accordance with impulses given thereto by cam-operated microswitch 331. However, coincidentally with the activities initiated by the stepping switch are those which are strictly mechanical. The first of these is the engagement and advancement of the film 5 by the motive fingers 315, 316 of the slide assembly 300. Motor 322 rotates bar 320 which reciprocates slide 303 through the action of the inter-connected push-pull bar 317. At the back of the first stroke the tips 316 of the rear pair of finger bars 309 are just behind the first pair of film slots 18 of the non-moving film strip. On the first full forward stroke or slide 303 the end or tips 316 of the rear pair of finger bars 309 will come into engagement with the respective slots 18 in the film as depicted schematically in FIG. 33. Hence the entire film strips will be moved forward one stroke's distance in track 306, i.e., to the position shown schematically in FIG. 34.

As the slide 303 begins its next rearward stroke (cycle No. 2) the tips 315, 316 pivot up and ride on top of the surface of film 5 (FIG. 14). On this same rotation of the shaft 321, cam 333 has caused microswitch 331 to advance the stepping switch another step, which in turn activates the motor 381 of the cover advance assembly.

Motor 381 rotates shaft 390 through one revolution, whereupon motor 381 is stopped by microswitch 393. This singel rotation, as explained herebefore, causes the inter-connected Geneva mechanism 382 to rotate dispensing drum 375 through a one-quarter turn. As a result, the one cover's length of cover material 373 is fed off the dispensing drum 375 thereby causing the leading edge of the cover material to move from its initial position at the edge 375 of cavity 336 (FIG. 33) over the cavity to the opposite edge 356. The front cover of the booklet is now in position for cutting (see FIG. 34).

On this second step of the operation the film strip 5 is again advanced by the slide assembly, and on this cycle both pairs of tips 315, 316 of the finger bars 307, 308, 309, 310 engage into the slots 18 of the film strip, and advance it so that at the end of the forward stroke the lead edge of the film 5 is at the edge 356 of the cavity 336 (see FIG. 35).

On the first portion of the third cycle the main motor 322 causes rotating cam 365 to engage wheel 364 of tamping arm 358 and to thereupon thrust end 361 downward against the fixed pin 362 of slideable plate 341. The latter causes the fixedly attached cutting block 338 to descend into cavity 336, thereby cutting the cover material at the interface of edges 355 and 357. The first or front cover 473 dropped to the bottom 348 of cavity 336 (see FIG. 35). As shown by a comparison of FIGS. 21 and 22 the tamper 340 and cutting block 338 have ascended by action of spring 368 when the slide is in the forward-most position and the cutting block has descended into cavity 336 when the slide 303 is at its rearward-most position.

On this same third cycle or step, the slide 303 again backs up (FIG. 36) re-engages the film as before and moves it forward. This time the leading edge of the film is thrust across the cavity to the opposite edge 357 thereof (see FIG. 37 and FIG. 21).

On the fourth cycle the slide 303 returns to pick up another frame's length of film as before, and, simultaneously, the cutting block descends on the first frame 337 positioned over the cavity 336 in the previous cycle and cuts it at the interface between edges 354 of the cutting block and 356 of the table. Frame 337 drops to the bottom of cavity 336 where it rests on top of and in alignment with cover 473 (see FIG. 38).

The succeeding cycles or steps are identical to the previous cycle until only one frame remains in the slide groove 306. For example, using the illustration of a twenty-five frame strip, cycle No. 3 feeds the first frame for cutting as described above, and succeeding cycles 4 through 27 feed frames 2 through 24 in the identical manner. On the twenty-eighth cycle only one frame remains in the slide assembly. Since the film-advancing fingers 307, 308, 309, 310 at this point have no succeeding frame to engage with, they are powerless to feed the last frame to the cavity 336. This function is now performed by the forwardly projecting flat plate 323. As the slide assembly backs up on the twenty-eighth cycle, the notched front end 324 of plate 323 drops behind the trailing edge of the last frame. As the slide 303 begins its forward movement, the notch 324 engages the trailing edge of the film (see FIG. 39) and pushes it into the cavity 336 (see FIG. 40). As shown in FIG. 21, the notched end 324 of plate 323 is adapted to come right up to the edge 356 of cavity 336 when the slide 303 is at its forward-most position, thus assuring the proper feeding of the last frame.

On the next, or twenty-ninth, cycle, the stepping switch activates the cover advance assembly in the same manner as described above with reference to cycle No. 2, whereupon the back cover is cut and stacked in cavity 336 on top of the last image frame (see FIG. 23).

On cycle thirty the stepping switch activates the solenoid 404 of the tamper locking apparatus which results, as previously explained, in the locking bar 403 rotating into a vertical position when the tamper 340 is at the bottom of its descent, thereby temporarily preventing the vertical ascent of the tamper. This is illustrated schematically in FIG. 42 and is depicted in FIG. 24.

With the tamper 340 locked in the down position by locking bar 403, the bottom or anvil face of the cutting block 338 is forcefully compressing the stack of cover-sandwiched frames 44 in cavity 336 (see FIG. 24), thereby forming a tight booklet and providing a firm support for the stapling operation. The pre-punched holes 43 in the frames and covers are in alignment and overlie the opposed head 350 of the stapler and underlie the staple-turning slots 410 in the anvil face of cutting block 338.

On the succeeding cycle, the stepping switch momentarily actuates the stapler solenoid 411 which, as explained above, transfers the inward motion of solenoid plunger 412 into a forceful upward stroke of staple plunger 400 via intervening rack and pinion assemblies 413, 416, 418 and 419. As a consequence, the ends of a staple 398 are inserted through the pre-aligned holes 43 and are turned inwardly by the concave slots 410 of the anvil face. This state of affairs is illustrated schematically in FIG. 43 and depicted in FIG. 24.

If desired, a step may be provided just prior to the last described step for the sole purpose of assuring that locking bar 403 is in the vertical lock position. This is, of course, an optional safety factor.

On the cycle succeeding the driving of the staple as described above, the stepping switch, as actuated through cam operated microswitch 331, cuts solenoid 404 out of circuit thereby permitting spring 408 to cause rack and pinion 406, 407 to return locking bar 403 to its unengaged horizontal position. This releases the tamper 340 and attached cutting block 338, which return vertically to their rest position by action of spring 368. This status is shown schematically by FIG. 44 and depicted in FIG. 25. The stapling operation is now completed and the stapled booklet 44 is prepared to be received into the back clip 425.

At this point an advance of the stepping switch results in the latter turning off main motor 322 and starting the reversible ejector motor 432. This causes the slideable member 427, which holds or retains the booklet in its rectangular cut-out, to move from its rest position against set screw 474 in the direction of the arrow as shown in FIG. 29. The motive force is provided by the pinion 431 on motor 432 mating with the rack 430 on slideable plate 427. During its movement, slideable plate 427 pushes the leading edge of booklet underneath depression plate 445 where it becomes compressed for easy insertion into clip 425. Simultaneously, pin 436 maintains the back edge of clip 425 out of interfering contact with the booklet, and wedge-shaped tongue bar 433 opens the clip wide for easy receipt of the compressed booklet. As movement of plate 427 continues the booklet 44 is inserted into clip 425 in the manner and with the cooperation of the elements just mentioned. Clip 425 is prevented from moving by reason of its abutment against follow-up clip 426 held at the bottom of chute 423. The tongue bar 433 progresses through the clip, widening the entrance way for the booklet (see FIG. 26).

The booklet 44 thereupon becomes fully inserted into clip 426 (see FIGS. 27 and 29), and the completed booklet 42 is in position for a free fall out of the entire assembly and into a waiting chute for dispensing the same to the operator. This is assured by another operation.

The arrival of slideable plate 427 to the position of FIGS. 27 and 29 causes it to contact and close microswitch 446 (see FIG. 16) which activates hammer solenoid 457. Solenoid 457 as described above, causes hammer head 450 to descend through hole 451 in table 345 so as to strike booklet 42 and thereby forcefully remove it from slideable plate 427 and into a dispensing chute. This is depicted by the dotted lines in FIG. 27.

Not only does contact with microswitch 446 actuate the knock-out assembly, but it also reverses motor 432 which thereupon withdraws the slideable plate 427 towards its home position. It is noted that as the wedge-shaped tongue bar 433 emerges from clip 425 on its forward movement it becomes inserted into follow-up clip 426 (FIG. 29). Hence on the return or reverse trip as actuated by microswitch 446, the tongue bar 433 carries with it follow-up clip 426 (see FIG. 31), which thereupon becomes the lead clip 425 for the next booklet. A new follow-up clip drops into position at the bottom of chute 423 by gravity feed.

When slideable plate 427 returns to its home position it hits microswitch 448 which shuts off motor 432 (see FIGS. 28, 16). Either microswitch 446 or 448 can be made operative to reset the master stepping switch for the next complete cycle of the whole booklet preparation stage.

As previously mentioned, the preferred device of the booklet preparation stage has a safety latch 458 associated with the slideable booklet movement and ejector assembly that assures that member 427 remains in position and does not accidentally interfere with the free movement of cutting block 338.

This latch 458 operates in the following way. By reference to FIG. 46 it is seen that initially the lips 353 on bar 461 are biased firmly against the wall 346 of slideable member 427 so as to hold it precisely in the correct plane for receipt of the cutting block 338. Each cut cover or frame rests on these lips 353 at a slight incline as shown. Finger 463 rests against the bottom of plate 427.

As the frames pile up in cavity 336 they form a solid contact between the lips 353 and the descending cutting block 338, such that when all frames and covers are in place, the cutting block has forced bar 461 out of cavity 336 and thereby disengaged lips 353. This action also permits finger 463 to rotate to the upright position as dictated by stud 466 where it rests against the under surface of slideable member 427. This serves to hold lips 353 out of contact with slideable member 427 (see FIG. 23).

After slideable member 427 has moved laterally past the lips 353, there is no support for finger 461, and the bar returns to a horizontal rest position against pin 470 (see FIG. 26). As slideable plate 42 makes its return movement, it contacts and rides over the beveled edge of lips 353 and forces pin 463 down. As the trailing edge of the cavity wall of slideable plate 427 passes the lips 353, bar 461 rotates upward and again locks slideable plate 427 firmly in the home position (FIG. 24). It is thus seen that latch 458 provides a useful and automatic means for maintaining a moveable member in a fixed position demanding close tolerances and for permitting ready detachment when movement is required.

Although the operations performed by the booklet preparation stage are many, the overall performance speed is remarkably fast. For instance, as seen in the time chart of FIG. 45, the entire operation of this stage can be done in much less than a minute with each cycle or revolution of the main motor taking about one second. Chart 45 also depicts the relative lengths of activation of the various electrically powered components and the relative times at which they are activated.

Although the above description is directed to a specific embodiment of the invention, it is used for illustrative purposes only, and it is obvious that other variations and modifications could be used without departing from the true scope of the invention described.

What I claim is:

1. An automatic photographic apparatus for taking a series of pictures of a given subject matter in rapid sequence on a sensitized strip and for compiling them together sequentially, comprising in combination a camera, a light-tight frame in said camera adapted to receive a continuous strip of film therewithin, tracks in said light-tight frame for guiding said film, a lens mounted on the front of said camera, means for positioning said film in an aperture at a fixed distance from the lens, a first drive means for moving said film in said track and past said aperture at a predetermined rate, means for exposing said film at a predetermined rate as said film is moved past said aperture, switch means for halting said drive means after the exposure of a predetermined number of frames of said film, an automatic knife means for cutting the exposed film from said continuous strip of film after said switch means has halted said first drive means, a second frame disposed adjacent said automatic knife means adapted to receive said cut exposed film strip, a track in said frame for the guiding of said cut film, a first compartment adapted to contain developer solution for developing the image on said cut film, a second compartment adapted to contain water for washing of said cut film, a dryer unit with heated air therein adapted to receive the developed film strip and cause the drying thereof, a second drive means for moving said cut film through the developer, washer and dryer units, an automatic cutting means for segmenting booklet cover material and said exposed film strip into individual frame-sized plates disposed adjacent said dryer unit, a first receptacle for storing a supply of continuous booklet cover material, automatic drive means adapted to advance said cover material into cooperative relation with said cutting means, dispensing means cooperative with said automatic means adapted to selectively advance said cover material segmented by said automatic cutting means in frame-sized portions, a film strip advancing means for feeding said film strip into cooperative relation with said cutting means wherein said film strip is cut into frame-sized portions, a second receptacle for receiving the individual frame-sized plates of film and cover material cut by said cutting means so as to form a stack thereof, an automatic tamper means for momentarily compressing said stack, automatic stapler means for stapling said stack together while compressed, and control means for actuating each of the foregoing automatic means in a predetermined sequential pattern.

2. The combination according to claim 1 wherein said booklet preparation unit has, in addition, automatic binder means for slideably inserting the stapled stack into a binding clip overlying said staple.

3. The combination according to claim 1 wherein said booklet preparation unit has, in addition, automatic means for removing the stapled stack from said unit.

4. The combination according to claim 1 wherein said shutter means for exposing said camera at a predetermined rate comprises a strobe light external to said camera frame and located in otherwise darkened surroundings and a switch operatively connected to said strobe light and actuated by frame-sized movements of said film as advanced by said first driving means, whereby actuation of said switch by movement of said film through one frame's distance energizes said strobe light so as to instantaneously expose said film through said lens.

5. An automatic photographic apparatus for taking a series of pictures of a given subject matter in rapid sequence on a sensitized strip and for compiling them together sequentially, comprising in combination a camera, a light-tight frame in said camera adapted to receive a continuous strip of film therewithin, tracks in said light-tight frame for guiding said film, a lens on the front of said camera, means for positioning said film in an aperture at a fixed distance from the lens, a first drive means for moving said film in said track and past said aperture at a predetermined rate, shutter means for exposing said film at a predetermined rate as said film is moved past said aperture, switch means for halting said drive means after the exposure of a predetermined number of frames of said film, an automatic knife means for cutting the exposed film from said continuous strip of film after said switch means has halted said first drive means, a second frame disposed adjacent said automatic knife means adapted to receive said cut exposed film strip, a track in said frame for the guiding of said cut film, a first compartment adapted to contain developer solution for developing the image on said cut film, and a second compartment adapted to contain water for washing of said cut film, a dryer unit with heated air therein adapted to receive the developed film strip and cause the drying thereof, a second drive means for moving said exposed film to the developer, washer and dryer units, an automatic cutting means for segmenting booklet cover material and said exposed film strip into individual frame-sized plates disposed adjacent said dryer unit, a first receptacle for storing a supply of continuous booklet cover material, automatic drive means adapted to advance said cover material into cooperative relation with said cutting means, a dispensing means cooperative with said automatic drive means to selectively advance said cover material segmented by said automatic cutting means in frame-sized portions, a film strip advancing means for feeding said film strip into cooperative relation with said cutting means wherein said film strip is cut into frame-sized portions, a second receptacle for receiving the individual frame-sized plates of film and cover material cut by said cutting means so as to form a stack thereof, an automatic tamper means for momentarily compressing said stack, automatic stapler means for stapling said stack together while compressed, automatic binder means for slideably inserting the stapled stack into a binding clip overlying the staple, automatic ejector means for forcibly removing the bound booklet from said booklet preparation unit, and control means for actuating each of the foregoing automatic means in a predetermined sequential pattern.

References Cited

UNITED STATES PATENTS

| 2,640,207 | 6/1953 | De Florenz | 11—1 |
| 3,038,180 | 6/1962 | Levitan | 11—1 |
| 2,351,399 | 6/1944 | Caracciolo | 95—14 X |

JOHN M. HORAN, Primary Examiner

PO-1050
(5/69)

UNITED STATES PATENT OFFICE
CERTIFICATE OF CORRECTION

Patent No. 3,513,758      Dated May 26, 1970

Inventor(s) Thomas A. Patty

It is certified that error appears in the above-identified patent and that said Letters Patent are hereby corrected as shown below:

Column 1, line 47, change "observe" to -- observer -- ;
Column 1, line 61, change "staples" to -- staple -- .
Column 3, line 6, change "oof" to -- of -- ;
Column 3, line 9, change "29" to -- 30 -- and "28" to -- 29 -- ;
Column 3, line 10, change "ing" to -- showing -- .
Column 4, line 66, change "An" to -- Any -- .
Column 9, line 3, change "an" to -- and -- ;
Column 9, line 37, change "one" to -- once -- .
Column 10, line 62, change "an" to -- at -- .
Column 14, line 51, correct spelling of "invention".
Column 15, line 14, change "or" (first occurrence) to -- of -- .
Column 17, line 13, change "426" to -- 425 -- .

SIGNED AND
SEALED
SEP 15 1970

(SEAL)
Attest:

Edward M. Fletcher, Jr.
Attesting Officer

WILLIAM E. SCHUYLER, JR.
Commissioner of Patents